United States Patent
Bengtzen

(10) Patent No.: US 8,910,956 B2
(45) Date of Patent: Dec. 16, 2014

(54) MULTI-FUNCTION CART

(71) Applicant: Troy Bengtzen, Holladay, UT (US)

(72) Inventor: Troy Bengtzen, Holladay, UT (US)

( * ) Notice: Subject to any disclaimer, the term of this patent is extended or adjusted under 35 U.S.C. 154(b) by 0 days.

(21) Appl. No.: 13/898,352

(22) Filed: May 20, 2013

(65) Prior Publication Data
US 2013/0249176 A1    Sep. 26, 2013

Related U.S. Application Data

(63) Continuation-in-part of application No. 13/545,903, filed on Jul. 10, 2012, now Pat. No. 8,662,506, which is a continuation-in-part of application No. 13/545,893, filed on Jul. 10, 2012, now Pat. No. 8,556,276.

(60) Provisional application No. 61/507,978, filed on Jul. 14, 2011.

(51) Int. Cl.
| | |
|---|---|
| *B62B 1/04* | (2006.01) |
| *B62B 1/12* | (2006.01) |
| *B62B 1/00* | (2006.01) |
| *B62B 3/02* | (2006.01) |
| *B65D 21/02* | (2006.01) |
| *A45C 5/14* | (2006.01) |
| *A45C 9/00* | (2006.01) |
| *B62B 5/00* | (2006.01) |
| *A45C 5/03* | (2006.01) |
| *B62K 27/00* | (2006.01) |
| *B62B 15/00* | (2006.01) |
| *B62B 1/18* | (2006.01) |
| *B62B 1/20* | (2006.01) |
| *B62B 5/06* | (2006.01) |

(52) U.S. Cl.
CPC . *B62B 1/12* (2013.01); *B62B 1/002* (2013.01); *B62B 3/02* (2013.01); *B65D 21/0234* (2013.01); *A45C 5/14* (2013.01); *A45C 9/00* (2013.01); *B62B 5/0013* (2013.01); *B62B 5/0079* (2013.01); *A45C 5/03* (2013.01); *B62K 27/003* (2013.01); *B62B 15/004* (2013.01); *B62B 15/007* (2013.01); *B62B 1/186* (2013.01); *B62B 1/20* (2013.01); *B62B 5/067* (2013.01); *B62B 2205/104* (2013.01); *B62B 2206/006* (2013.01); *A45C 2009/005* (2013.01); *A45C 2009/007* (2013.01); *B62K 2710/12* (2013.01)
USPC ...... 280/79.2; 280/30; 280/47.18; 280/47.26; 220/4.24

(58) Field of Classification Search
CPC ..... B65F 1/1468; B65F 1/1473; B65D 21/00; B65D 21/0209; B65D 21/0228; B65D 21/0234; B65D 11/28; B65D 11/188; A45C 9/00; A45C 5/14; A45F 4/06; A47B 1/00; B62B 1/00; B62B 1/002; B62D 13/00; B62R 9/00
USPC ................ 280/651, 47.131, 47.18, 47.26, 30, 280/79.2, 28.12, 659; 220/4.24, 4.258, 220/4.26, 4.27, 212, 641, 643, 646, 651, 220/652, 653, 735, 756, 772, 769, 770, 761, 220/762, 763
See application file for complete search history.

(56) References Cited

U.S. PATENT DOCUMENTS 1,015,966 A  *  1/1912  Larson ........................ 280/47.23
4,147,369 A  *  4/1979  Simpson ......................... 280/30

(Continued)

*Primary Examiner* — J. Allen Shriver, II
*Assistant Examiner* — Steve Clemmons
(74) *Attorney, Agent, or Firm* — Michael F. Krieger; Kirton McConkie

(57) ABSTRACT

A multi-function cart for storing and transporting emergency or other supplies. The multi-function cart comprises a shell and lid or two shells that can be secured together to form a transportable storage container. When separated, each shell is convertible into various configurations that can be used to sustain life during and after a disaster as well as to clean up and rebuild after a disaster has occurred. In this manner, the multi-function cart enables victims to quickly care for themselves, and encourages victims to immediately begin the clean-up and rebuilding process. The multi-function cart can also be used recreationally. Each shell is convertible into different configurations using various tubes. Hub brackets on opposing sides of the shell include adapters to which any of the tubes can be connected. The tubes can be connected to the adapters in an upward or a downward orientation to form different configurations.

20 Claims, 36 Drawing Sheets

(56) References Cited

U.S. PATENT DOCUMENTS

| | | | |
|---|---|---|---|
| 4,253,677 A * | 3/1981 | Wissler | 280/40 |
| 4,457,546 A * | 7/1984 | Wiant et al. | 293/102 |
| 4,705,280 A * | 11/1987 | Burns | 280/40 |
| 4,729,574 A * | 3/1988 | Tipke | 280/415.1 |
| 4,889,360 A * | 12/1989 | Havlovitz | 280/655.1 |
| 5,042,674 A * | 8/1991 | Ramsay et al. | 220/4.24 |
| 5,285,936 A * | 2/1994 | Matricardi, Jr. | 224/484 |
| 5,318,315 A * | 6/1994 | White et al. | 280/47.26 |
| 5,332,114 A * | 7/1994 | Sano et al. | 220/4.24 |
| 5,653,457 A * | 8/1997 | Marmer et al. | 280/30 |
| 5,692,761 A * | 12/1997 | Havlovitz | 280/33.994 |
| 5,897,131 A * | 4/1999 | Brown et al. | 280/7.12 |
| 6,296,297 B1 * | 10/2001 | Barrow et al. | 296/173 |
| 6,345,638 B1 * | 2/2002 | Warner | 135/123 |
| 6,805,253 B1 * | 10/2004 | Nicholson et al. | 220/4.05 |
| 7,032,921 B2 * | 4/2006 | Swanner | 280/645 |
| 7,144,019 B2 * | 12/2006 | Lee | 280/47.26 |
| 7,252,295 B2 * | 8/2007 | Bludworth | 280/33.991 |
| 7,284,763 B1 * | 10/2007 | King | 280/47.26 |
| 7,513,511 B2 * | 4/2009 | Chaseateau | 280/47.27 |
| 8,496,298 B2 * | 7/2013 | Martini et al. | 298/5 |
| 2005/0045508 A1 * | 3/2005 | Lu | 206/372 |
| 2006/0119060 A1 * | 6/2006 | Sullivan et al. | 280/79.11 |
| 2007/0029761 A1 * | 2/2007 | Darling, III | 280/640 |
| 2007/0164526 A1 * | 7/2007 | Martini et al. | 280/47.26 |
| 2008/0217503 A1 * | 9/2008 | Zhuang | 248/558 |
| 2008/0277221 A1 * | 11/2008 | Josefson et al. | 190/18 A |
| 2009/0008204 A1 * | 1/2009 | Yen | 190/18 A |
| 2009/0057305 A1 * | 3/2009 | Moreau | 220/4.27 |
| 2010/0032927 A1 * | 2/2010 | Gordon | 280/659 |
| 2010/0090444 A1 * | 4/2010 | Chen et al. | 280/651 |

\* cited by examiner

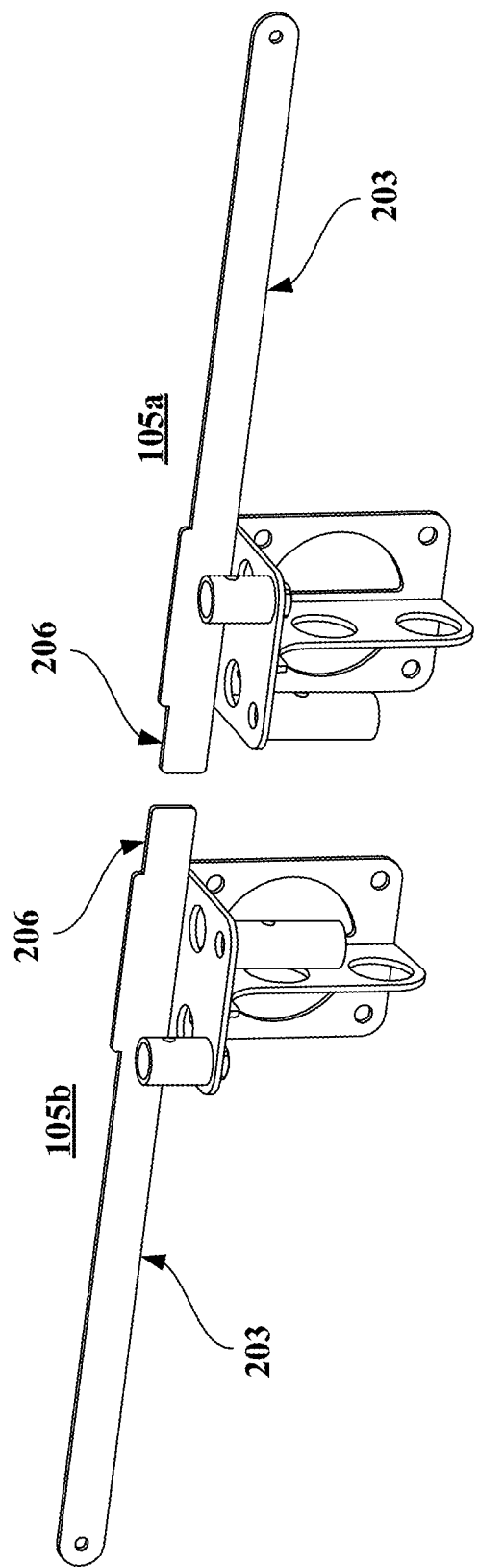

MULTI-FUNCTION CART

CROSS-REFERENCE TO RELATED APPLICATIONS

This application is a continuation-in-part of U.S. patent application Ser. No. 13/545,903, titled Multi-Function Cart and filed Jul. 10, 2012, and of U.S. patent application Ser. No. 13/545,893, titled Convertible Aid Cart and filed Jul. 10, 2012, both of which claim priority to U.S. Provisional Patent Application No. 61/507,978, titled Mobile Adaptable Survival Container, which was filed on Jul. 14, 2011.

BACKGROUND

When a disaster occurs, whether natural or man-made, the injury and death toll often depends on how quickly emergency supplies can be delivered to the victims of the disaster. Oftentimes, victims rely on emergency responders outside the disaster zone to supply the necessary supplies. These emergency responders, in some cases, may not be able to reach many victims in a timely fashion such as when the disaster is of great magnitude or widely spread.

For example, if a large number of people are in need of emergency supplies, the supplies available within close proximity of a disaster may not be adequate to treat each victim. Similarly, even if adequate supplies exist within close proximity, it may be difficult or impossible to transport the supplies to those in need. Personal and community preparedness is the key to minimizing injuries and the loss of life. Convenience and cleanliness are also key factors in responding to emergency events.

BRIEF SUMMARY

The present invention is directed to a multi-function cart for storing and transporting emergency, camping, recreational, or other supplies. The multi-function cart serves initially as a mobile storage container having a compact design that allows the storage container to be stored in many different locations including inside or outside the home, business, institution, church, or other buildings, and above or below ground such as on a deck or patio, in a shed, garage, or basement, etc. where it can be quickly accessed in case of an emergency or simply for convenience sake. The convenience and cleanliness provided by this product is a key benefit of this device.

The multi-function cart is convertible from the mobile storage container into various devices that provide functionality to sustain life during or after a disaster, and to clean-up and rebuild after a disaster has occurred. In this manner, the multi-function cart enables victims to maintain a semblance of normalcy and to quickly care for themselves, their families, classmates, coworkers, or neighbors in the event of an emergency, and further encourages victims to immediately begin the clean-up and rebuilding process after the emergency.

The multi-function cart can be used to store emergency or other supplies that are necessary or useful in an emergency situation. The multi-function cart allows these supplies to be packed into a single container having a small footprint that can be positioned in virtually any location where it will be most easily accessible in the event of an emergency. Further, the multi-function cart is portable in various ways to allow the supplies to be transported more easily. For example, the multi-function cart can be transported by hand or by virtually any mechanical means, including in or on top of a car, van, or SUV, in a truck, in a trailer or even as a self-contained trailer, etc.

The various devices into which the multi-function cart can be converted provide many immediately accessible tools for use during and after an emergency event to assist in sustaining life, providing relief, cleaning up, rebuilding, etc.

The multi-function cart can also be used outside of emergency situations including for commercial or recreation purposes, such as camping, scouting, etc. In short, the multi-function cart of the present invention can be used as a compact, portable storage unit for virtually any supplies, and converted into various different devices for use in many different scenarios.

In one embodiment, a multi-function cart comprises a first and a second shell. Each shell comprises a plurality of tubes, and a pair of hub brackets attached on opposing sides of the shell. Each hub bracket includes an adapter that is configured to allow any of the tubes to be attached thereto. In some embodiments, each hub bracket also has at least one hole through which a tube can be inserted. In other embodiments, the hub bracket has no hole through which a tube can be inserted. In such embodiments, the tube can be contained in the cart or can be attached to the hub bracket for storage by another means, such as by a clip or other tube holder.

Each pair of hub brackets is aligned on the corresponding side of the shell so that one or more tubes can be stored along the surface of the shell by inserting each tube through a corresponding hole in each hub bracket of the pair of hub brackets, and so that the first shell can be secured to the second shell when the second shell is aligned with the first shell by connecting each hub bracket on the first shell to an opposing hub bracket on the second shell. In certain embodiments, a support bar extends between each pair of support brackets on the same side of the shell to act as an exterior frame member to make the sides of the shell more rigid and strong.

In another embodiment, a multi-function cart comprises a first shell having a set of wheels attached on one end and a plurality of interchangeable tubes. The shell has a hub bracket attached on opposing sides of the shell, each hub bracket being configured with corresponding holes for storing one or more of the interchangeable tubes. Each hub bracket also includes an adapter configured to receive any of the interchangeable tubes, at least one of the hub brackets comprising a portion configured such that any of the interchangeable tubes can be inserted over and surrounding the portion to form a handle for the shell.

In another embodiment, a multi-function cart comprises a plurality of tubes, a first shell, and a second shell. The first shell comprises pairs of hub brackets attached on opposing sides of the first shell, each hub bracket including an adapter configured to allow any of the tubes to be attached thereto. Each hub bracket of the first shell also has at least one hole through which a tube can be inserted, with each pair of hub brackets being aligned on the corresponding side of the first shell so that one or more tubes can be stored along the surface of the first shell by inserting each tube through a corresponding hole in each hub bracket of the pair of hub brackets. The second shell also comprises pairs of hub brackets attached on opposing sides of the second shell, each hub bracket including an adapter configured to allow any of the tubes to be attached thereto. Each hub bracket of the second shell also has at least one hole through which a tube can be inserted, each pair of hub brackets being aligned on the corresponding side of the second shell so that one or more tubes can be stored along the surface of the second shell by inserting each tube through a corresponding hole in each hub bracket of the pair of hub brackets. The hub brackets on the first and second shell are aligned so that the first shell can be secured to the second shell when the second shell is aligned with the first shell by connecting each hub bracket on the first shell to an opposing hub bracket on the second shell.

In another embodiment, a multi-function cart comprises a first and a second shell, and a plurality of interchangeable tubes. The interchangeable tubes may include feet attached thereto. Each shell has a set of wheels attached on one end, and a lip extending along a top edge of the sides. In another embodiment, a multi-function cart comprises a plurality of tubes, not all of which are interchangeable, as some may vary in size or diameter to provide differing functions.

Each shell also has a pair of hub brackets attached on opposing sides of the shell that are configured with corresponding holes for storing one or more interchangeable tubes. Each hub bracket also includes a top and a bottom adapter. Each adapter is configured to receive any of the interchangeable tubes.

In some embodiments, each of the hub brackets is positioned on the sides of the shell so that an opening formed in the lip aligns with the hub bracket such that any of the interchangeable tubes can be inserted into the opening and engage with the hub bracket to form a handle for the shell. Alternatively, a portion of the hub bracket may extend through the opening such that the interchangeable tubes first engage with the hub bracket and continue such engagement as they are inserted into the openings. Additionally, the positioning of the hub brackets permits the first shell to be secured to the second shell when the second shell is aligned with the first shell by connecting a top adapter of each hub bracket on the first shell to an opposing top adapter on a hub bracket of the second shell using a clamping or securing device that draws the respective hub brackets of the two shells together and permits a variable force to be exerted between the hub brackets, as needed. Thus, the clamping or securing device may be adjusted as necessary to maintain a seal between the two shells.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 9A-9F illustrate exemplary hub brackets that are attached to embodiments of the multi-function cart;

DETAILED DESCRIPTION

Figure 1A:
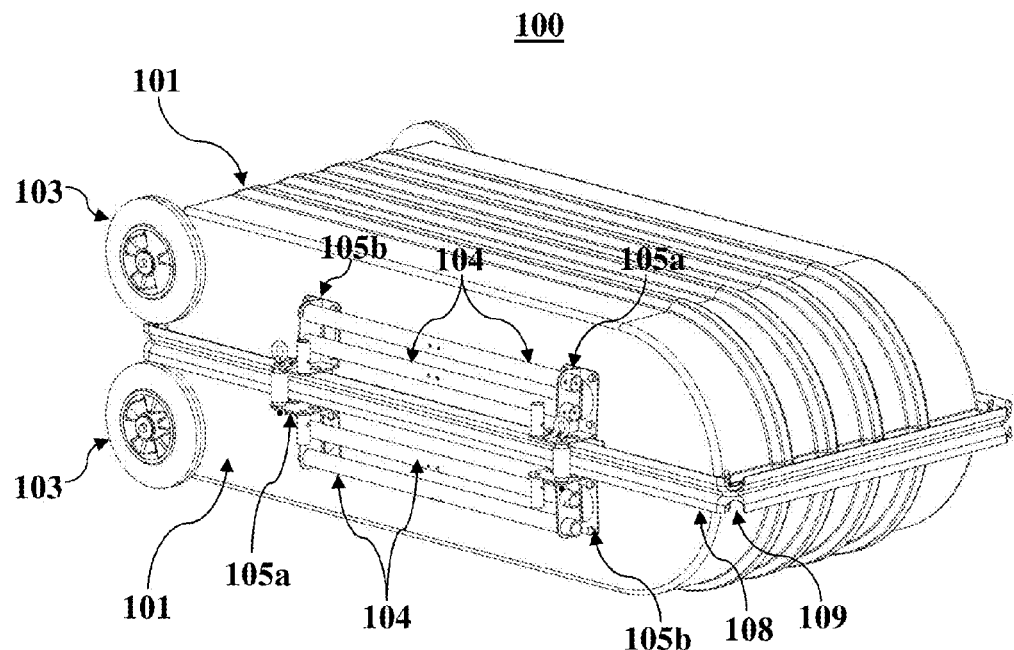
FIGS. 1A-1D illustrate a multi-function cart according to one or more embodiments of the invention.

The present invention is directed to a multi-function cart for storing and transporting emergency, camping, recreational, or other supplies. The multi-function cart serves initially as a mobile storage container having a compact design that allows the storage container to be stored in many different locations including inside or outside the home, business, institution, church, or other buildings, and above or below ground such as on a deck or patio, in a shed, garage, or basement, etc. where it can be quickly accessed in case of an emergency or simply for convenience sake. The convenience and cleanliness provided by this product is a key benefit of this device.

The multi-function cart is convertible from the mobile storage container into various devices that provide functionality to sustain life during or after a disaster, and to clean-up and rebuild after a disaster has occurred. In this manner, the multi-function cart enables victims to maintain a semblance of normalcy and to quickly care for themselves, their families, classmates, coworkers, or neighbors in the event of an emergency, and further encourages victims to immediately begin the clean-up and rebuilding process after the emergency.

The multi-function cart can be used to store emergency or other supplies that are necessary or useful in an emergency situation. The multi-function cart allows these supplies to be packed into a single container having a small footprint that can be positioned in virtually any location where it will be most easily accessible in the event of an emergency. Further, the multi-function cart is portable in various ways to allow the supplies to be transported more easily. For example, the multi-function cart can be transported by hand or by virtually any mechanical means, including in or on top of a car, van, or SUV, in a truck, in a trailer or even as a self-contained trailer, etc.

The various devices into which the multi-function cart can be converted provide many immediately accessible tools for use during and after an emergency event to assist in sustaining life, providing relief, cleaning up, rebuilding, etc.

The multi-function cart can also be used outside of emergency situations including for commercial or recreation purposes, such as camping, scouting, etc. In short, the multi-function cart of the present invention can be used as a compact, portable storage unit for virtually any supplies, and converted into various different devices for use in many different scenarios.

In one embodiment, a multi-function cart comprises a first and a second shell. Each shell comprises a plurality of tubes, and a pair of hub brackets attached on opposing sides of the shell. Each hub bracket includes an adapter that is configured to allow any of the tubes to be attached thereto. In some embodiments, each hub bracket also has at least one hole through which a tube can be inserted. In other embodiments, the hub bracket has no hole through which a tube can be inserted. In such embodiments, the tube can be contained in the cart or can be attached to the hub bracket for storage by another means, such as by a clip or other tube holder.

Each pair of hub brackets is aligned on the corresponding side of the shell so that one or more tubes can be stored along the surface of the shell by inserting each tube through a corresponding hole in each hub bracket of the pair of hub brackets, and so that the first shell can be secured to the second shell when the second shell is aligned with the first shell by connecting each hub bracket on the first shell to an opposing hub bracket on the second shell. In certain embodiments, a support bar extends between each pair of support brackets on the same side of the shell to act as an exterior frame member to make the sides of the shell more rigid and strong.

In another embodiment, a multi-function cart comprises a first shell having a set of wheels attached on one end and a plurality of interchangeable tubes. The shell has a hub bracket attached on opposing sides of the shell, each hub bracket being configured with corresponding holes for storing one or more of the interchangeable tubes. Each hub bracket also includes an adapter configured to receive any of the interchangeable tubes, at least one of the hub brackets comprising a portion configured such that any of the interchangeable tubes can be inserted over and surrounding the portion to form a handle for the shell.

In another embodiment, a multi-function cart comprises a plurality of tubes, a first shell, and a second shell. The first shell comprises pairs of hub brackets attached on opposing sides of the first shell, each hub bracket including an adapter configured to allow any of the tubes to be attached thereto. Each hub bracket of the first shell also has at least one hole through which a tube can be inserted, with each pair of hub brackets being aligned on the corresponding side of the first shell so that one or more tubes can be stored along the surface of the first shell by inserting each tube through a corresponding hole in each hub bracket of the pair of hub brackets. The second shell also comprises pairs of hub brackets attached on opposing sides of the second shell, each hub bracket including an adapter configured to allow any of the tubes to be attached thereto. Each hub bracket of the second shell also has at least one hole through which a tube can be inserted, each pair of hub brackets being aligned on the corresponding side of the second shell so that one or more tubes can be stored along the surface of the second shell by inserting each tube through a corresponding hole in each hub bracket of the pair of hub brackets. The hub brackets on the first and second shell are aligned so that the first shell can be secured to the second shell when the second shell is aligned with the first shell by connecting each hub bracket on the first shell to an opposing hub bracket on the second shell.

In another embodiment, a multi-function cart comprises a first and a second shell, and a plurality of interchangeable tubes. The interchangeable tubes may include feet attached thereto. Each shell has a set of wheels attached on one end, and a lip extending along a top edge of the sides. In another embodiment, a multi-function cart comprises a plurality of tubes, not all of which are interchangeable, as some may vary in size or diameter to provide differing functions.

Each shell also has a pair of hub brackets attached on opposing sides of the shell that are configured with corresponding holes for storing one or more interchangeable tubes. Each hub bracket also includes a top and a bottom adapter. Each adapter is configured to receive any of the interchangeable tubes.

In some embodiments, each of the hub brackets is positioned on the sides of the shell so that an opening formed in the lip aligns with the hub bracket such that any of the interchangeable tubes can be inserted into the opening and engage with the hub bracket to form a handle for the shell. Alternatively, a portion of the hub bracket may extend through the opening such that the interchangeable tubes first engage with the hub bracket and continue such engagement as they are inserted into the openings. Additionally, the positioning of the hub brackets permits the first shell to be secured to the second shell when the second shell is aligned with the first shell by connecting a top adapter of each hub bracket on the first shell to an opposing top adapter on a hub bracket of the second shell using a clamping or securing device that draws the respective hub brackets of the two shells together and permits a variable force to be exerted between the hub brackets, as needed. Thus, the clamping or securing device may be adjusted as necessary to maintain a seal between the two shells.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

Figure 1B:
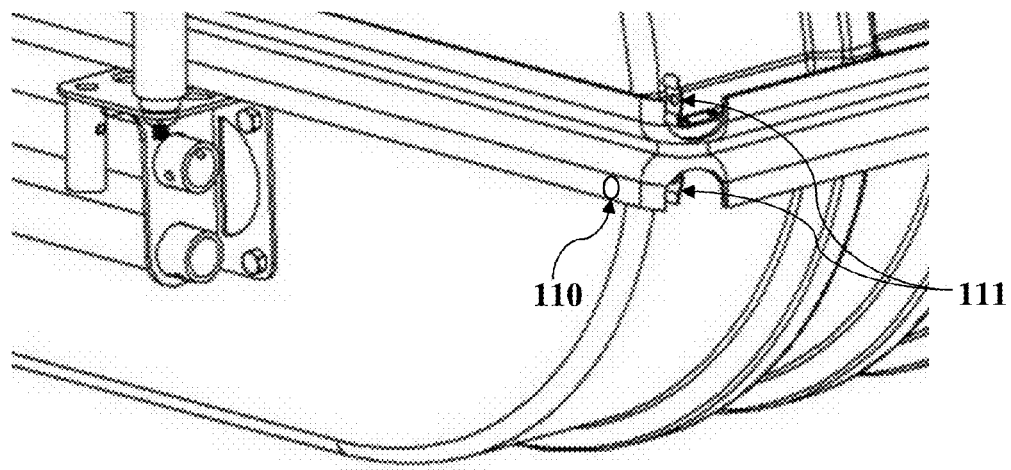

FIGS. 1A-B illustrate an exemplary multi-function cart 100 according to one or more embodiments of the invention. Multi-function cart 100 comprises two shells 101 that can be joined together in the manner shown in FIG. 1A. Each of shells 101 includes a wheel assembly 103, tubes 104, and hub brackets 105a-b. Two shells 101 together form a mobile container for containing emergency or other supplies. Shell 101 can be made of plastic (e.g. polyethylene), metal, composites, or any other suitable material or combination of materials, and may be made using any desirable process. For example, shell 101 may be thermoformed, injection molded, or manufactured by a combination process, such as by placing steel frame elements in a mold and then injection molding plastic elements around the frame elements. Thus, when certain elements are discussed herein as being attached to shell 101, they could attached by any appropriate means or connector or may alternatively be formed with or embedded within the shell by a combination forming process.

In some embodiments, the materials used for shell 101 can be resistant to the elements, including UV rays and extreme ranges of heat and cold, as well as extreme forces. Shell 101 can also be manufactured with a reflective coating to increase its visibility, or a partial or complete reflective coating may be added at any time, such as through the use of stickers. Additionally, a coating or application may be provided to at least a portion of the shell 101 that stores light energy during periods of high illumination (e.g. the day) and releases it for at least a portion of dark periods (e.g. the night). In some embodiments, multi-function cart 100 can include (e.g. have embedded or be connected to) one or more digital electronic devices such as intermediate frequency receiver chips, global position system devices, emergency radio receivers, electricity generating devices and/or storage devices, solar panels, lights, beacons, audio devices such as sirens, etc.

Although FIG. 1A illustrates shell 101 as having a sled shape, shells of other concave shapes can also be used. The shape of shell 101 may be selected to provide desirable aerodynamic benefits such as for when shell 101 is carried on a vehicle. The sled or other shape can facilitate the transport of shell 101 via dragging. In some embodiments, each of shells 101 can be identically configured (i.e. in shape, size, and components). However, in some embodiments, one shell 101 may not include wheel assembly 103, tubes 104, and/or brackets 105a-b (in which case, one shell 101 can be configured to stack within the other shell 101). In some embodiments, one shell 101 may have a different size, shape, or design than the other shell 101.

In some embodiments, shells 101 can be configured to allow multiple shells 101 to be stacked on top of each other individually, or to facilitate the stacking of multiple multi-function carts 100. For example, the shells 101 or multi-function carts 100 might be stacked in shipping containers or otherwise for shipping and rapid bulk deployment of shells 101 or multi-function carts 100 to a disaster area, might be stacked for storage including inside, outside, above ground, below ground, etc. Multi-function cart 100 can also include one or more instructions, diagrams, pictographs, or photographs attached thereto which describe how to use each feature or primary features of multi-function cart 100. In some embodiments, shell 101 can include one or more drains to control the inflow/outflow of fluids. Such drains can include a removable drain plug for selectively sealing the drain. Additionally, such drains may be configured for connection to a filter device so that shell 101 and the filter device may be used for water storage and filtration, such as gravity filtration.

Figure 1C:
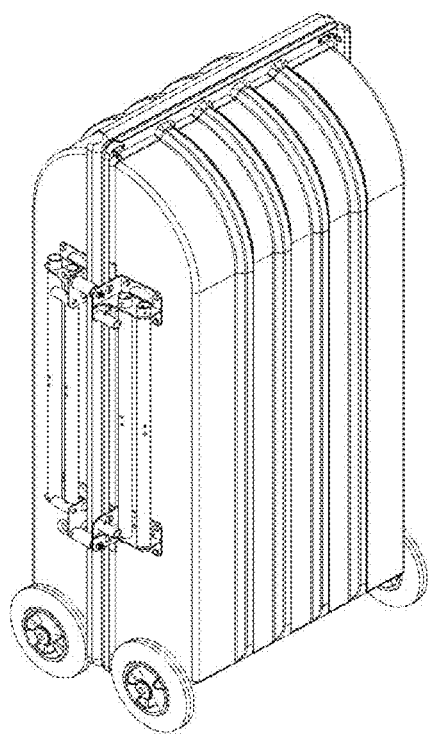

Wheel assembly 103 comprises two wheels and an axle that extends through or otherwise attaches to shell 101. Wheel assembly 103 enables multi-function cart 100 to be easily transported by hand or by other means, and enables the conversion of each shell 101 of multi-function cart 100 into various other devices as will be further described below. Additionally, as will be described in more detail below, wheel assembly 103 may function in conjunction with additional wheel assemblies or casters corresponding to an opposite end of shell 101 to convert shell 101 into a four-wheeled cart. In some embodiments, wheel assembly 103 may comprise only one wheel instead of two per shell 101, and a balancing block may be provided to permit two shells 101 to stably stand as shown in FIG. 1C. Where only one wheel is present, it may be centrally located. In still other embodiments, particularly smaller and/or lighter embodiments, no wheel assembly 103 is present, and shell 101 is designed to be either carried or dragged.

In the illustrated embodiment, hub brackets 105a-b store tubes 104 while tubes 104 are not in use. Each shell 101 includes two sets of hub brackets 105a-b (totaling four hub brackets), one set on opposite sides of the shell. As shown, a set of hub brackets 105a-b secures two tubes 104 to shell 101. The opposite side of shell 101, which is not shown in FIG. 1A, is likewise configured with a set of hub brackets 105a-b that secures two tubes 104. In the remainder of the description, the hub brackets 105a-b may be referred to generally as hub brackets 105. Although hub brackets 105 shown in the Figures are configured to secure two tubes 104, hub brackets 105 could be configured to store one or more tubes in some embodiments. In other embodiments, hub brackets 105 may not be configured to secure any tubes 104 and tubes 104 may be stored within shell 101. Additionally, although hub brackets 105 shown in the Figures are configured as separate components 105a-b, hub brackets 105 may alternatively be configured as a single unitary hub bracket 105 on each side of shell 101, as will be discussed in more detail below.

Figures 2A, 2B:
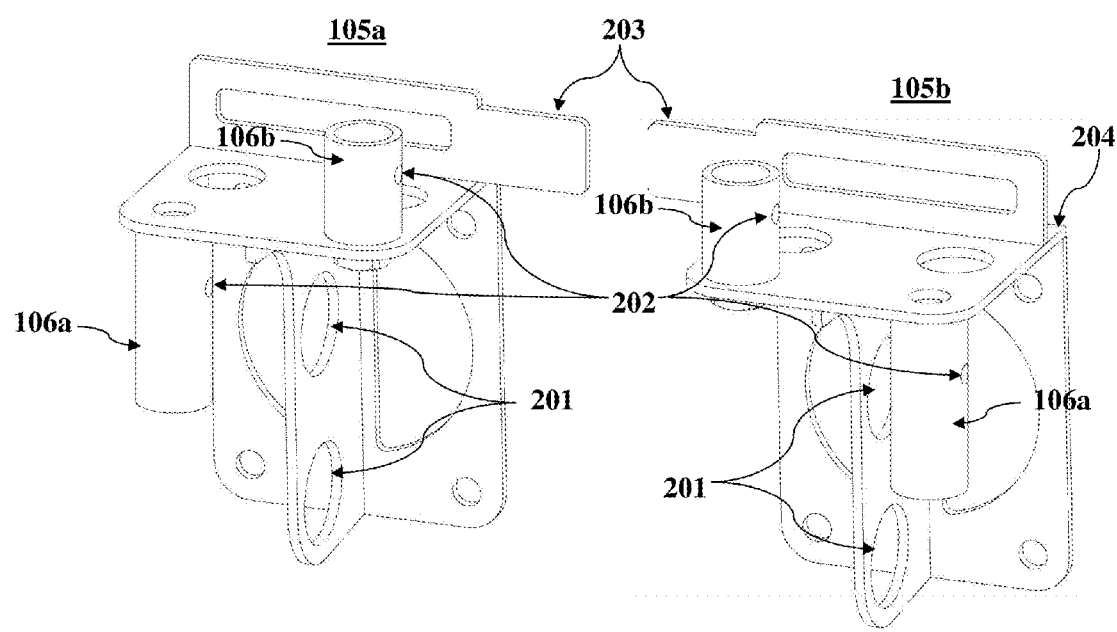
FIGS. 2A-2C illustrate exemplary hub brackets that are attached to embodiments of the multi-function cart.

Each hub bracket 105 includes adapters 106a-b as shown in FIGS. 2A-2B. In the remainder of the description, adapters 106a-b may be referred to generally as adapters 106. In some embodiments, adapters 106a-b are integrated into hub brackets 105 (e.g. as a single molded part, or by welding or by any other appropriate means of attachment). In other embodiments, adapters 106a-b are separate and removable from hub brackets 105. Adapters 106a-b can be used to attach tubes 104 to hub brackets 105 in various configurations as will be further described below.

Each of tubes 104 can be of the same diameter and length to allow interchangeable use of tubes 104 in the various configurations described below. Alternatively, tubes 104 may vary in length and/or diameter to satisfy differing functional needs. Each of tubes 104 includes various holes for attaching the tubes to various components or adapters using a pin (or other type of connector) in these various configurations.

Shell 101 further includes a lip 108 along the top of the sides ("top" and "sides" here referring to shell 101 disposed in a substantially horizontal position with its major opening facing upward). Lip 108 as shown in the illustrated embodiment comprises a curved or curled protrusion of shell 101 along the top edge as is shown in FIGS. 1A and 1B. Lip 108 can be formed along all of the sides of shell 101 as shown in FIG. 1A, or alternatively, could be formed along any number or portion of the sides of shell 101, such as along only two opposing sides of shell 101, along three sides of shell 101, etc.

Each lip 108 includes an opening 109 on one or both ends through which a tube 104 can be inserted to engage a respective hub bracket 105 to form a handle as will be further described below. In the embodiment illustrated in FIG. 1A, openings 109 are located at each of the four corners of shell 101. Accordingly, a handle can be formed using any of tubes 104, in a similar manner, at up to all four lip corners of shell 101. Similarly, if shell 101 has fewer than four openings 109, handles may be formed at up to as many corners of shell 101 as there are openings 109. FIG. 1A calls out a single opening 109 for sake of clarity; however, a similar opening 109 can be formed at each lip corner of each shell 101. While lip 108 is illustrated in the Figures and provides strength and rigidity to shell 101, it should be recognized that shell 101 may be formed without lip 108 (thereby obviating the need for openings 109), and strength and rigidity for shell 101 may be achieved by other means, such as by a complete or partial internal or external frame.

In some embodiments, lip 108 or any portion of shell 101 around the major opening of shell 101 can be configured to provide an air and/or water tight seal when two shells 101 are joined together in a reflective position at their respective major openings as shown in FIGS. 1A-1C. For example, one or both of shells 101 can be formed as or include a gasket or other type of seal along lip 108 to provide a seal between the respective lips 108 when shells 101 are joined.

In some embodiments, shells 101 can be joined by a hinge along one side. The hinge allows the shells to be pivoted along the hinged side similar to a clamshell. The hinge can be removable or separable to allow the complete detachment of each shell 101.

In some embodiments, one or more of shells 101 can include connection points, including connection points on hub brackets 105, such as holes, grommets, rivets, cutouts, pins, bars, inserts, etc. to which straps, ropes, handles, harnesses, chains, webbing, etc. can be connected to assist with transporting multi-function cart 100 or individual shells 101 (e.g. by human or mechanical power). The connection points could also be used to link together multiple shells 101 to form a large shelter. Such connection points can also be used to store multi-function cart 100. For example, the connection points can be used to mount multi-function cart 100 under an eave of a house, under the ceiling of a garage, on the side of a shed, along the rail of a ship, on the top of a car, in the bed or back of a truck, etc.

Hub brackets 105 are attached to shell 101 so that the spacing between tube-receiving portions of the hub brackets 105 and lip 108 are sufficient to receive tubes 104 when inserted through openings 109. For example, as shown in FIGS. 2A-2B, when the hub bracket 105 is attached to shell 101, portions 203 and 204 (portion 204 is only visible on hub bracket 105b in FIG. 2B) of the hub bracket form an opening between the hub bracket and lip 108 into which tubes 104 can be inserted. Portions 203 and 204 and lip 108 prevent tubes 104 from moving outwardly away from shell 101, or upwardly or downwardly along the exterior of shell 101, thus providing great strength to tubes 104 when used as handles as further described below. As will be discussed in more detail below, portion 203 may be extended in some embodiments such that portion 203 extends through opening 109, providing additional strength and security of attachment to the tube 104 used as handles, and also facilitating potential omission of lip 108.

A pin (not shown), or another type of connector, may be used to secure the position of tubes 104 when inserted into the opening formed between hub bracket 105 and lip 108. For example, as shown in FIG. 1B, lip 108 may include a hole 110 near opening 109 through which the pin is inserted (each corner of lip 108 can have a similar hole). A corresponding receptacle 111 for the pin may be attached to or formed within shell 101. Tubes 104 may also include corresponding holes so that the pin can extend through hole 110 and tube 104 and into receptacle 111 to further secure tube 104 when used as a handle. Alternatively, as discussed in more detail below, when portion 203 extends through opening 109 and beyond the edge of lip 108 (or shell 101 or external frame where lip 108 is not present), the pin extending through each tube 104 may extend through a corresponding hole in portion 203.

FIG. 1C illustrates multi-function cart 100 in an upright position. In the upright position, wheel assemblies 103 of each shell 101 enable multi-function cart 100 to be wheeled. In this manner, multi-function cart 100 can be easily moved and stored above or below ground even in locations where minimal space is available. In embodiments where only one shell 101 includes wheel assembly 103, the other shell 101 can include a balancing block to allow multi-function cart 100 to be placed in the upright position.

Figure 1D:
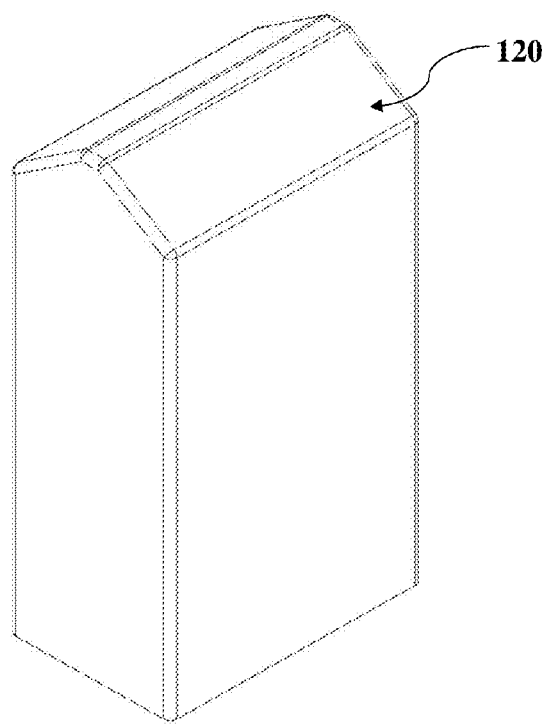

FIG. 1D illustrates multi-function cart 100 with the addition of a cover 120. Cover 120 can be used to protect multi-function cart 100 during storage such as when multi-function cart 100 is stored outside. Cover 120 can also be used to give multi-function cart 100 a pleasing appearance while stored. Accordingly, cover 120 can be provided in a variety of materials and colors. Cover 120 can also include contents descriptions, emergency information, instructions, directions, phone numbers, etc., such as in a sleeve or pouch affixed to the outside or inside of cover 120. The contents descriptions, emergency information, instructions, directions, phone numbers, etc. may alternatively be printed directly on cover 120 or may be sewn or otherwise permanently or semi-permanently affixed to cover 120.

FIGS. 2A and 2B illustrate hub brackets 105a and 105b respectively. Each of hub brackets 105a and 105b includes one or more holes 201 through which tubes 104 can be inserted to store tubes 104 when not in use. In one embodiment, tubes 104 can be maintained within holes 201 by inserting pins through holes on both ends of tubes 104 thus preventing the end from sliding out through hole 201. In another embodiment, tubes 104 may each have a foot portion such that tubes 104 can be secured in holes 201 using a pin inserted on only one end of tubes 104. Any other means of securing tubes 104 within holes 201 may also be used. Alternatively, hub brackets 105 may have a differing means for securing tubes 104 for storage, such as one or more clips, brackets, or other securing devices. Any configuration or device suitable for storing tubes 104 may be used with embodiments of hub brackets 105. As still another alternative, hub brackets 105 may have no means for securing tubes 104 for storage, and tubes 104 may be stored within shell 101. Adapters 106 are shown as including holes 202 for receiving a pin or other connector for securing tubes 104 to adapters 106. Of course, other means may be used to connect tubes 104 to adapters 106. However, by using pins that extend through tubes 104, the same holes and pins can be used to attach tubes 104 to shell 101 as handles, to attach tubes 104 to any of adapters 106, to secure tubes 104 within hub brackets 105 for storage, etc.

Figure 2C:
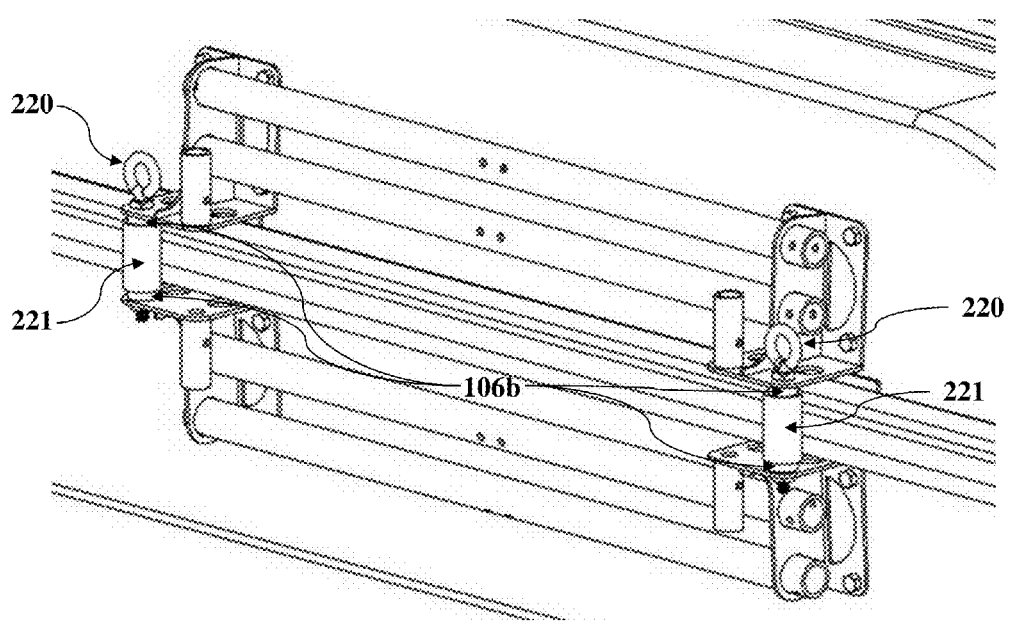

FIG. 2C illustrates how adapters 106b are used to connect one shell 101 to another shell 101. Hub brackets 105 are positioned on shell 101 so that when one shell 101 is inverted and aligned with another shell 101 with their respective major openings similarly oriented and aligned, the hub brackets 105 on both shells 101 are also aligned to allow a connector 220 to be used between a set of opposing adapters 106b as shown to secure the two shells together. In some embodiments, connector 220 can be an eyebolt that threads into each of the opposed adapters 106b or into a nut attached to the hub brackets 105 opposite the adapters 106b. As another example, connector 220 can be an eyebolt having a specially manufactured shank, wherein only a portion of the shank that is distal the eye of the eyebolt is threaded, and a significant remainder of the shaft between the eye and the threaded portion is machined or otherwise formed to have an outer diameter that is small enough that the un-threaded portion of the shaft can slidingly pass through a nut that would normally engage the threaded portion of the eyebolt. In this fashion, the eyebolt can be threaded through a nut associated with one adapter 106b until the threaded portion has passed completely through the nut, upon which the eyebolt is retained from falling out by the engagement of the nut and the threaded portion, but is otherwise free to slide within the nut until it engages the nut associated with the respective adapter 106b of the opposite shell 101, whereupon the eyebolt can be turned to engage the nut and apply a clamping force between the two shells 101. Where a form of seal is provided between the two shells 101, such clamping action may make the joined shells 101 effectively air and/or watertight. The foregoing examples of connector 220 are examples only: other types of connectors 220 can be used to secure two adapters 106b together.

Also, in some embodiments, a support tube 221 can be placed over top of a set of the aligned adapters 106b as shown to provide additional support and/or alignment for securing the two shells 101 together. In some embodiments, locking means can be used to lock together two shells 101. For example, where eyebolts are used as connectors 220, a cable lock may be threaded through the eyes of the eyebolts and then locked, preventing the eyebolts from being turned until the cable lock is removed. As another example, one (in the case of a hinged embodiment) or more clamp-type locks may be used to engage the respective lips 108 and secure shells 101 together.

Figure 3A:
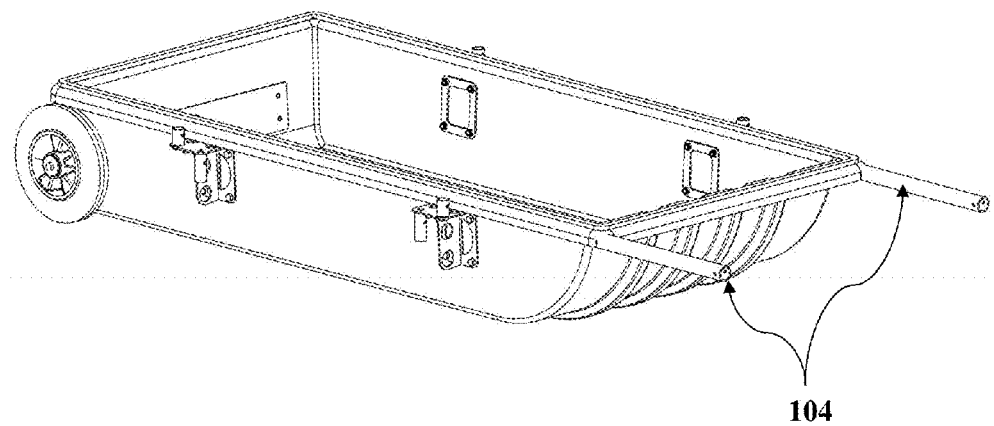
FIGS. 3A-3D illustrate various tube configurations for converting the multi-function cart into various devices.

FIG. 3A illustrates shell 101 when converted into a wheeled cart 301. As shown, to convert shell 101 into wheeled cart 301, two tubes 104 are connected to shell 101 to form handles by inserting the tubes 104 into opening 109 and through the opening formed between the hub brackets 105 and lip 108. The tubes 104 can be held in place using a pin as described above with respect to FIG. 1B or any applicable mechanism as discussed below. Cart 301 can be used to contain and/or haul the original contents of shell 101 or to contain and/or haul any other contents, such as debris, firewood, personal belongings, water for washing clothes, bathing, or mixing cement, or the like. Thus, if a cart is needed, shell 101 could be emptied of its contents and converted into cart 301, then when the containing and/or hauling needs are achieved, the original contents of shell 101 could be returned for storage, after any necessary cleaning and/or drying steps.

Figure 3B:
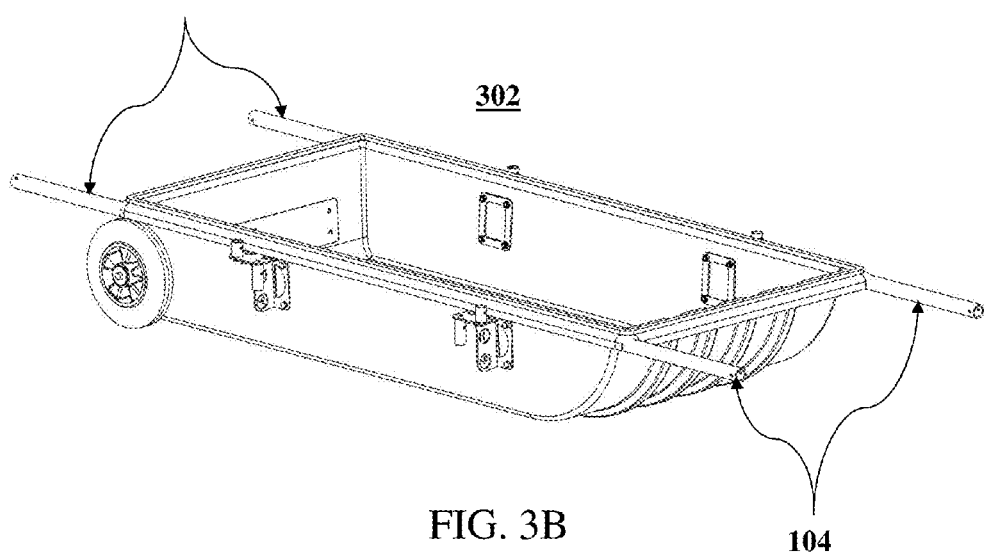

FIG. 3B illustrates shell 101 when converted into a two-person carrier 302. Two-person carrier 302 is similar to wheeled cart 301 with the addition of two additional tubes 104 as shown. These two additional tubes 104 are connected to the opposite end of the shell 101 in the same manner as described above thus providing handles on opposite ends of shell 101 to allow two people (or four or even more people) to carry carrier 302 with any contents. Two-person carrier 302 can be used to carry any type of material, object, or even people (i.e. two-person carrier 302 can serve as a stretcher for transporting victims of disaster or accident or the like, or could be used to transport any non-ambulatory person, including children).

Figure 3C:
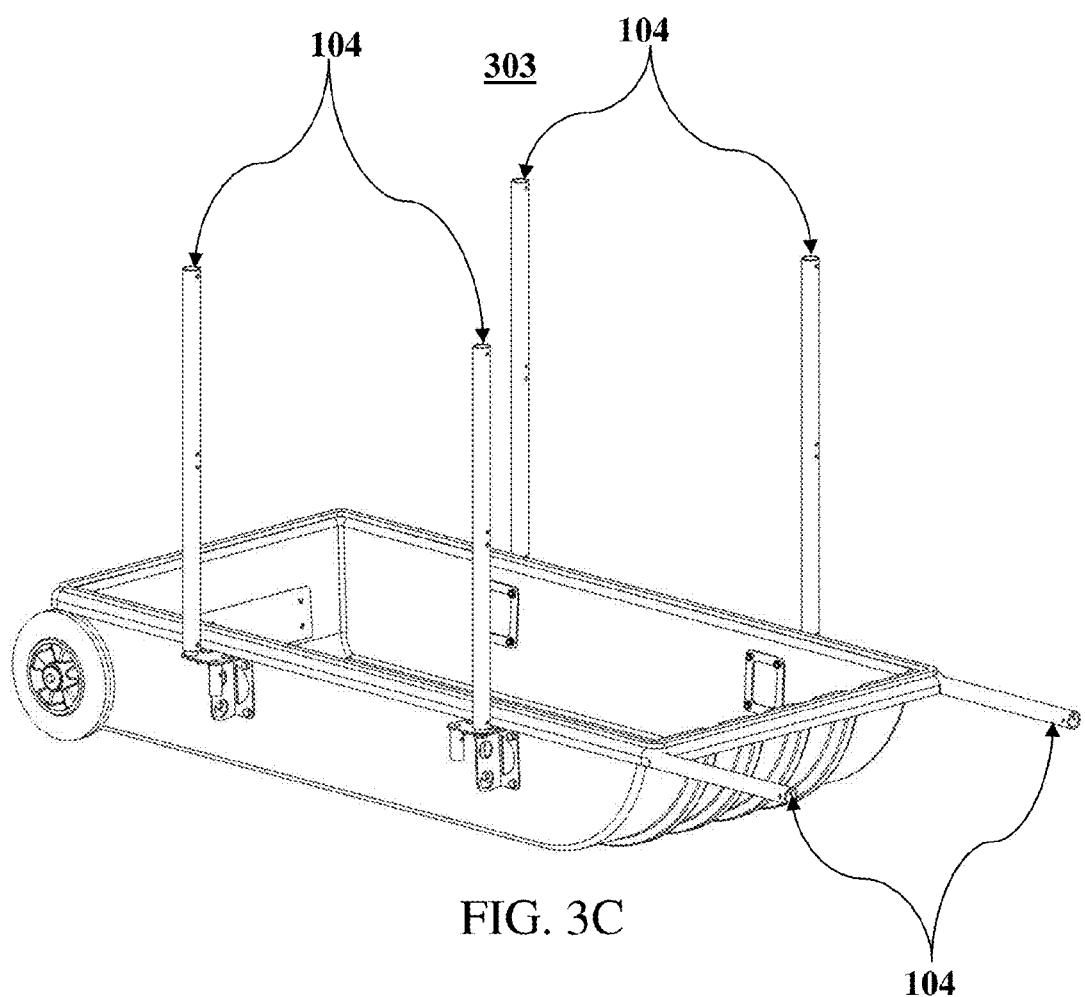

FIG. 3C illustrates shell 101 when converted into a stake-side bulk carrier 303. Stake-side bulk carrier 303 is similar to wheeled carrier 301 with the addition of four tubes 104 that are connected to adapters 106b (e.g. using a pin or other type of connector, or alternatively, using no connector) in a vertical position/orientation. In this configuration, tubes 104 provide support for maintaining bulk items within bulk carrier 303 during transport. The two additional tubes 104 used to convert shell 101 into stake-side bulk carrier 303 can be stored inside shell 101, and may be included in the emergency, camping, and/or recreational, etc. supplies initially contained within multi-function cart 100. The two additional tubes 104 can also be obtained from the other shell 101 of multi-function cart 100. Also, in embodiments where hub brackets 105 are configured to store three tubes 104 (e.g. when hub brackets 105 contain three holes 201), all six tubes 104 used for stake-side bulk carrier 303 can be stored within hub brackets 105.

Figure 3D:
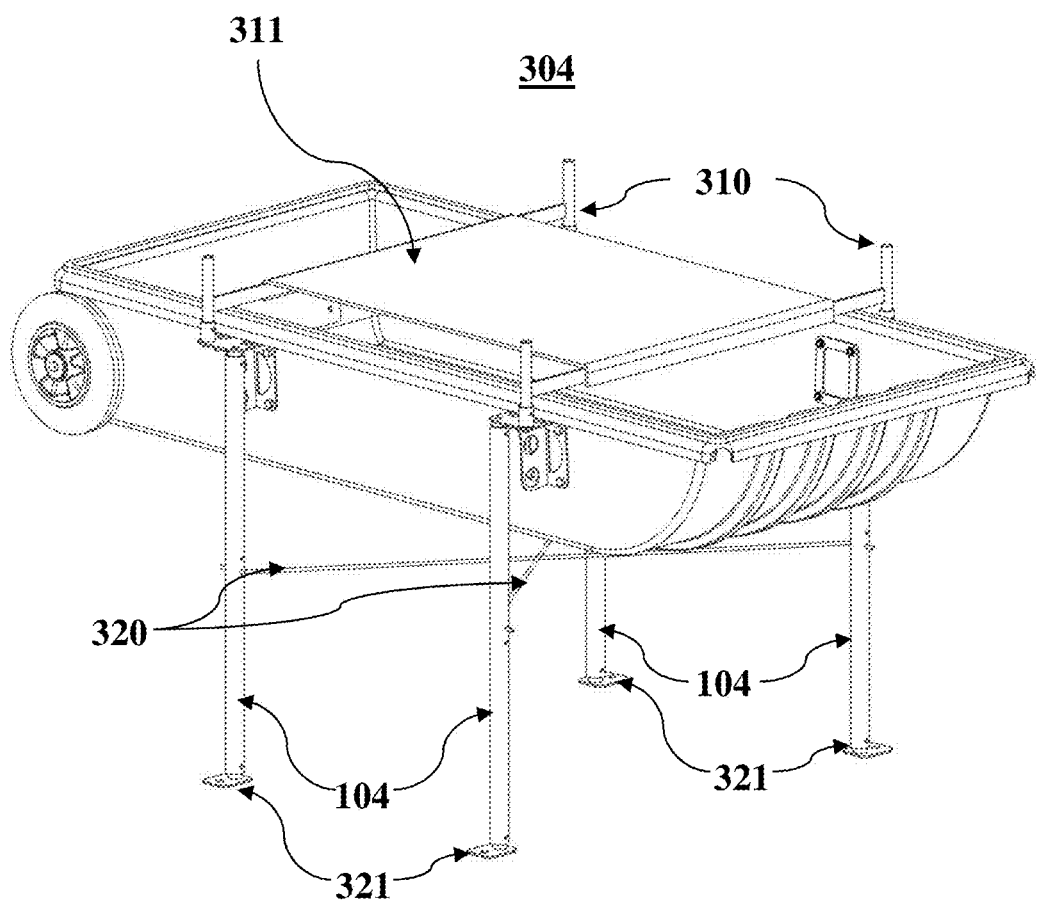

FIG. 3D illustrates shell 101 when converted into an elevated work area 304. To form elevated work area 304, tubes 104 are connected to adapters 106a (e.g. using a pin or other type of connector, or alternatively, using no connector) in a vertical downward position as shown. To form a table or elevated work surface, shell support bars 310 can be attached to adapters 106b, and surface 311 can be placed on, or otherwise connected to, shell support bars 310 as shown in FIG. 3D. Surface 311 can also attach directly to shell 101 without using shell support bars 310. For example, surface 311 can be rotated about a vertical axis ninety degrees from the orientation shown in FIG. 3d so as to rest on or engage lip 108 on opposite sides of shell 101. Such a configuration will be discussed in more detail below with respect to FIGS. 10C-10G. When surface 311 is not attached, elevated work area 304 forms an open basin. When surface 311 is attached, elevated work area 304 forms a partially covered basin that is partially covered by surface 311. The possible uses of elevated work area 304, whether configured as an open basin, partially covered basin, or surface 311 are innumerable, and may include by way of example, and not limitation, food preparation, food consumption, a work surface, a washing basin, a mixing basin, elevated storage, etc. In another embodiment, surface 311 may extend to completely cover shell 101 so as to form a completely-covered basin and/or a larger elevated work surface, providing additional possible uses for elevated work area 304.

Shell support bars 310 provide rigidity to shell 101 when used in these configurations. For example, when shell 101 is moderately to heavily loaded, the sides of shell 101 will tend to flex. Shell support bars 310 provide added strength and rigidity to shell 101 to enable shell 101 to hold its shape and a large amount of weight. Although shell support bars 310 are only shown being used in the elevated work area 304 configuration, they could be used in any of the disclosed configurations of shell 101 as desired to provide greater support to shell 101. Other embodiments may use other configurations to provide strength and rigidity to shell 101, including using internal or external supports, as will be discussed in more detail below.

Each shell support bar 310 is comprised of a horizontal bar that extends between two vertical legs. The legs on either end of shell support bar 310 can have a cylindrical shape to allow the legs to be connected to or merely inserted in adapters 106b. As shown in the embodiment of FIG. 3D, the legs of shell support bar 310 have an outer diameter that is small enough to allow the cylinders to be inserted into adapters 106b on either side of shell 101. Of course, the legs of shell support bar 310 may connect to adapters 106b in any desirable fashion.

The horizontal bar of shell support bar 310 can be configured in different forms. In FIG. 3D, the horizontal bar is shown as being straight thus giving the shell support bar 310 a general H shape. However, in other embodiments, the horizontal bar can be in the form of a U that follows the inside contour of shell 101 when shell support bar 310 is attached to adapters 106b. Alternatively, a U shaped shell support bar 310 can be designed to follow the outside contour of shell 101 (i.e. along the outer top edge of shell 101). Such designs are particularly useful when shell 101 is used as a cart, carrier, or basin, as it makes the entire shell 101 open and accessible. In some embodiments, shell support bar 310 can be inverted before insertion to provide a support frame for a tarp or other covering for shell 101 to effectively increase the internal storage capacity of shell 101.

To provide greater stability, leg support bars 320 and feet 321 can be attached to tubes 104 as shown. Feet 321 are designed to provide greater surface area to tubes 104 so that tubes 104 do not sink into the ground when shell 101 is loaded. Feet 321 can also have holes to allow the feet to be staked into the ground. Feet 321 may be reversibly attachable to tubes 104 as shown in FIG. 3D, or they may be substantially permanently attached to tubes 104, as will be discussed in more detail below. Shell support bars 310, surface 311, leg support bars 320, and feet 321 can be stored or contained within multi-function cart 100 when multi-function cart 100 is not configured as elevated work area 304.

Although not shown in the figures, an elevated work area can also be created by attaching tubes 104 to adapters 106b and inverting shell 101 so that the bottom of shell 101 forms a generally flat surface for the elevated work area. This configuration can also be used as a shelter. A lean-to type shelter could also be formed by using only two tubes 104 on one end of shell 101 in this configuration thus allowing the other end of shell 101 to rest on the ground.

Figure 4A:
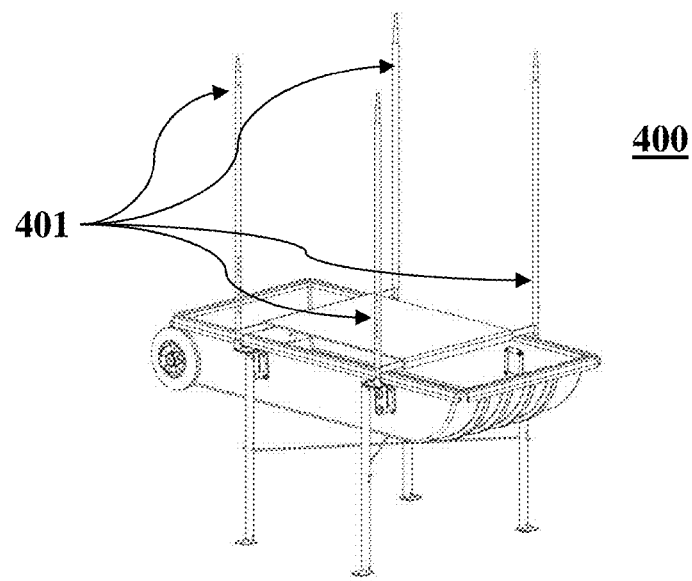
FIGS. 4A-4D illustrate a configuration of the multi-function cart as a covered work area.
Figure 4B:
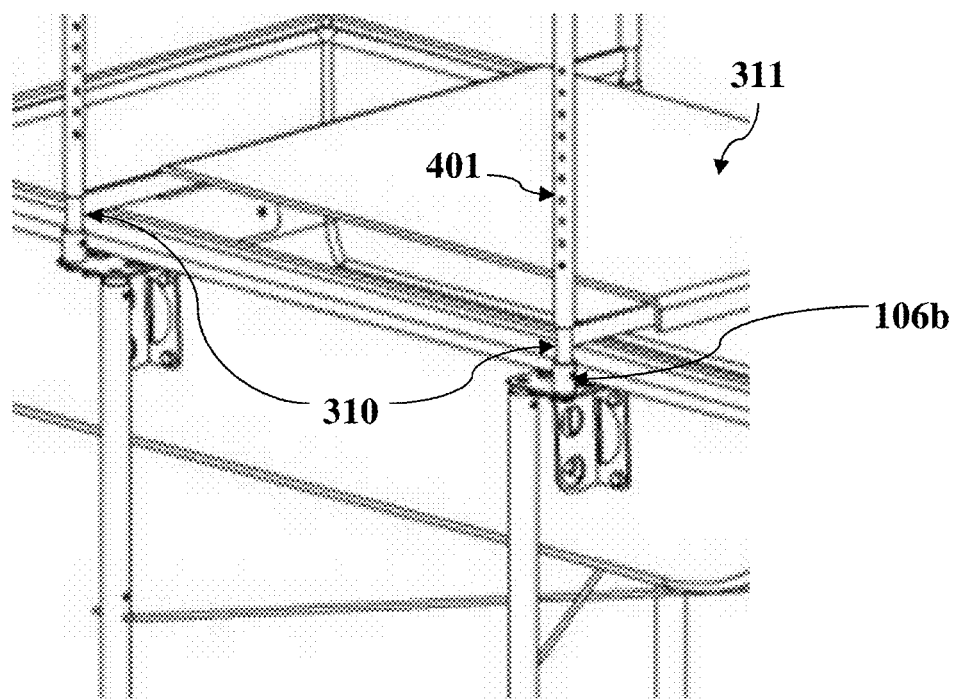

FIGS. 4A-4D illustrate elevated work area 304 with the addition of a canopy assembly 400. Canopy assembly 400 can be contained within multi-function cart 100 or otherwise made available. Canopy assembly 400 can comprise telescoping tubes 401, canopy 402, ropes 403-404, and shell support bars 310. Canopy 402 may be collapsible and may include, for example, spring bars and fabric to preferentially take a desired shape when assembled, such as the shape shown in FIGS. 4C and 4D, as is known in the art. To form canopy assembly 400, as shown in FIG. 4A-4D, telescoping tubes 401 are attached to shell support bars 310 (which are attached to adapters 106b) to form supports for canopy 402 as shown. Telescoping tubes 401 can be sized to fit over top of the vertical portion of shell support bars 310 as shown in FIG. 4B. Alternatively, though not shown in FIGS. 4A-4D, telescoping tubes 401 can be directly connected to or inserted in adapters 106b, or a separate insert may be used to connect telescoping tubes 401 to adapters 106b when shell support bars 310 are not used.

Figure 4C:
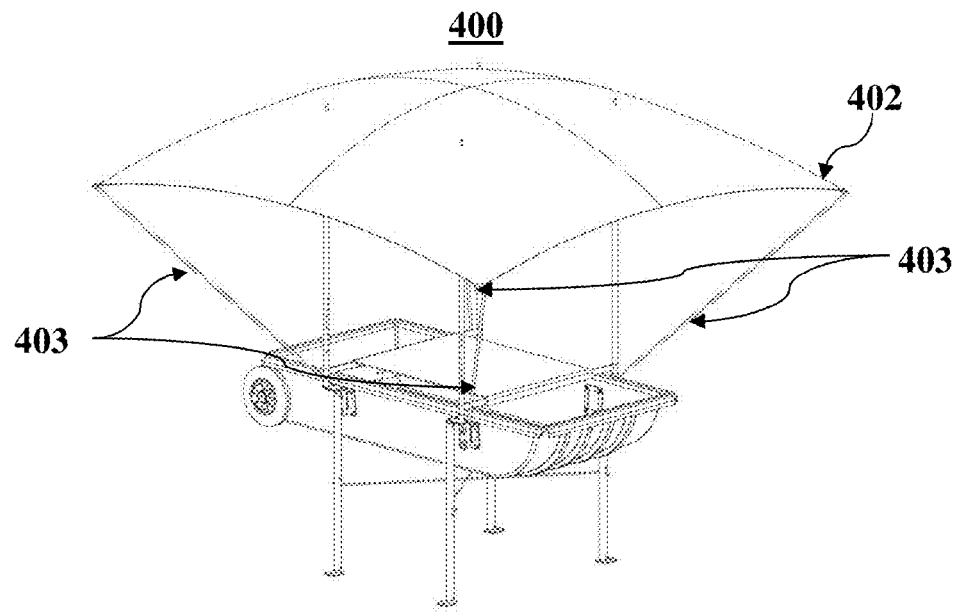

Telescoping tubes 401 can be extended to allow canopy 402 to be positioned at various heights. The top of each of telescoping tubes 401 can be tapered to conform to a corresponding hole, sleeve, or receiver in canopy 402 so that a portion of each telescoping tube extends through canopy 402 as shown in FIG. 4C or extends into the sleeve or receiver.

Figure 4D:
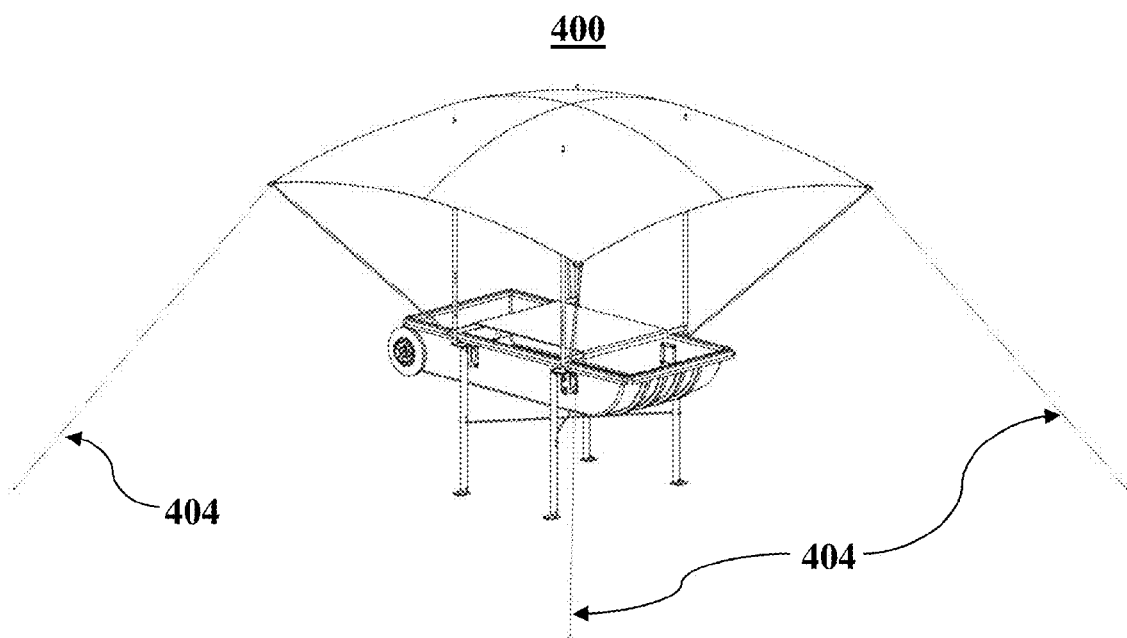

Canopy 402 can include various loops or rings to allow canopy 402 to be tied down to shell 101 or to the ground in various configurations. FIG. 4C shows each corner of canopy 402 being tied down to shell 101 using ropes 403. Of course, other materials other than rope could be used to tie down canopy 402 (e.g. bungee cords). Similarly, FIG. 4D shows each corner of canopy 402 being tied down or staked to the ground using ropes 404. Though not shown in the Figures, one or more corners of canopy 402 could be tied down to adjacent trees or other structures.

Figure 5A:
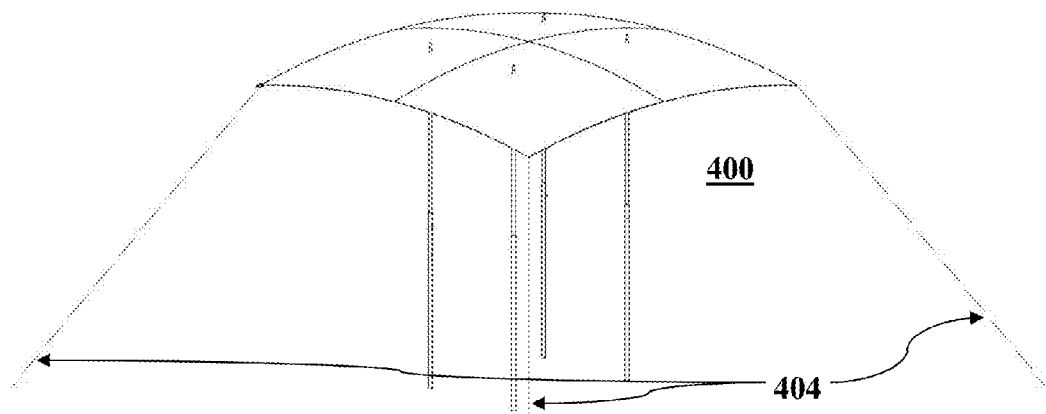
FIGS. 5A-5B illustrate a stand-alone canopy that can be configured using a canopy assembly stored within the multi-function cart.
Figure 5B:
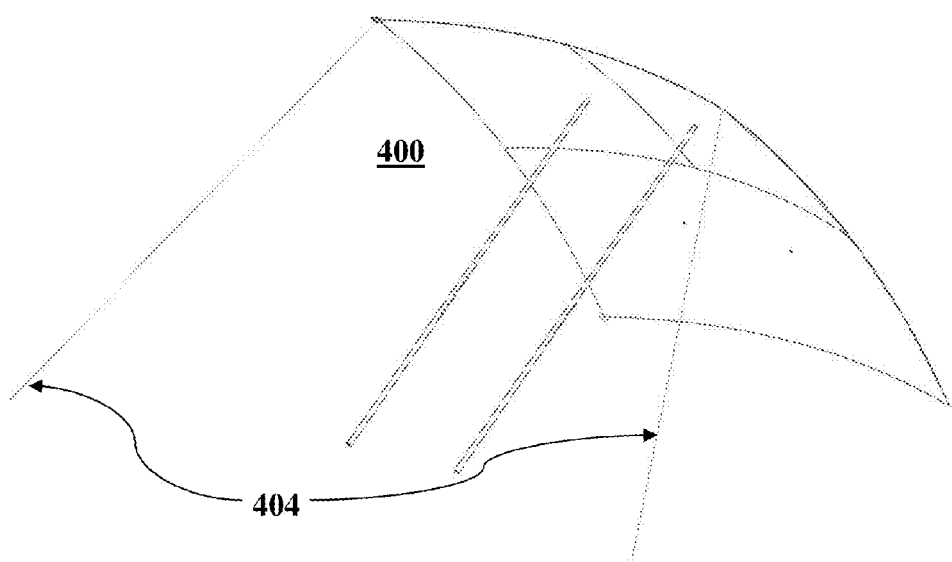

FIGS. 5A-5B illustrate canopy assembly 400 as a stand-alone unit. In some embodiments of the invention, canopy assembly 400 can be formed separately from shell 101. In FIG. 5A, canopy assembly 400 is shown in a generally upright position. In this configuration, telescoping tubes 401 have been extended, and ropes 404 are shown tying down canopy 402 to the ground. Canopy assembly 400 can also be used in an angled configuration as is shown in FIG. 5B. In this configuration, two telescoping tubes 401 are used thus allowing canopy 402 to tilt down to the ground. To secure canopy 402 in this configuration, the elevated corners of canopy 402 are tied down using ropes 404. The lower corners of canopy 402 may be staked down directly to the ground.

FIGS. 6A-6H illustrate shell 101 when converted into a cart 600. Cart 600 is formed using tubes 104 in conjunction with forks 601 and yoke bracket 603. As may be appreciated from FIGS. 6A-6H, cart 600 may be designed to provide an elevated work surface at a height similar to the work surface height discussed with respect to FIG. 3D, and it will be appreciated that essentially all functionality discussed with respect to FIG. 3D may be realized with the configuration of FIGS. 6A-6H. Forks 601 are similar to standard bicycle forks, but are configured on the top end to connect to adapters 106a in the same manner as tubes 104 connect to adapters 106a. Additionally, each of forks 601 contains multiple notches 602 for receiving a bicycle wheel axle. Notches 602 are spaced vertically along forks 601 to allow different sized wheels to be used including allowing a different sized wheel to be used on each side of cart 600. In such an embodiment, the wheels used with forks 601 may be provided with multi-function cart 100 or due to size/weight/bulk may be omitted from the stored contents of multi-function cart 100 but obtained at a time of use of multi-function cart 100, such as upon occurrence of an emergency. The wheels may be obtained from other devices, such as from available bicycles. As another embodiment where the wheels are provided with multi-function cart 100, the wheels may be pre-assembled or integrated with forks 601 or a similar supporting structure configured to be secured to adapters 106a, and may comprise a solid-plastic type five to six spoke wheel with a solid tire so as to avoid potential problems with tire deflation. As will be discussed later, a stabilizer may extend between lower portions of the respective forks 601 or other similar wheel-supporting structures to provide increased stability to cart 600 in this configuration.

A first set of tubes 104 are connected to adapters 106a to form legs for cart 600. Another set of tubes 104 (labeled 104a and 104b) are inserted through openings 109 and attached to hub brackets 105 of shell 101 as handles. Yoke bracket 603 is connected between tubes 104a and 104b to form a handle for pushing or pulling cart 600. Cart 600 can be configured with or without canopy assembly 400, shell support bars 310, yoke bracket 603, and surface 311 as represented in FIGS. 6A-6H.

Figure 6A:
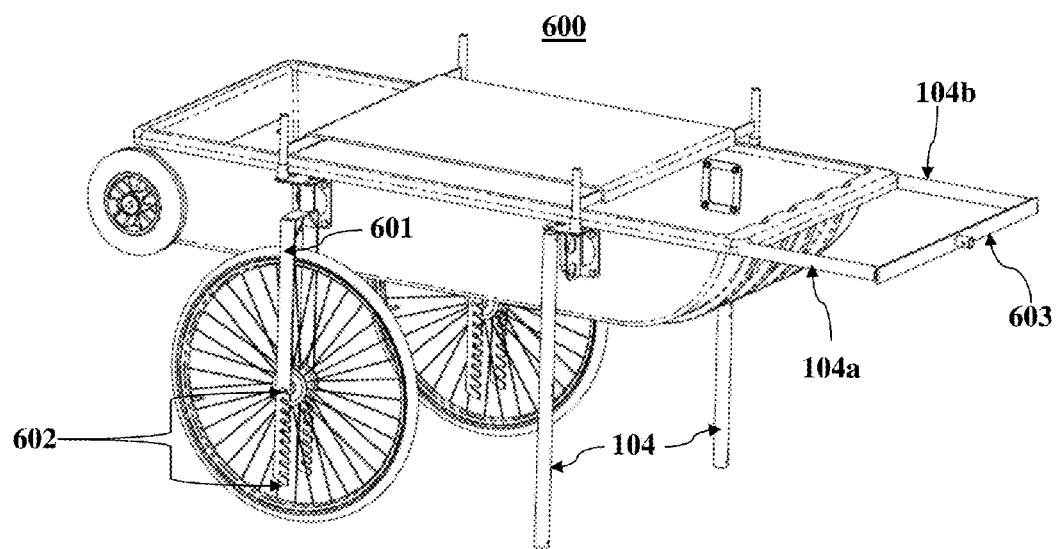
FIGS. 6A-6H illustrate various configurations of the multi-function cart as a cart or trailer.
Figure 6B:
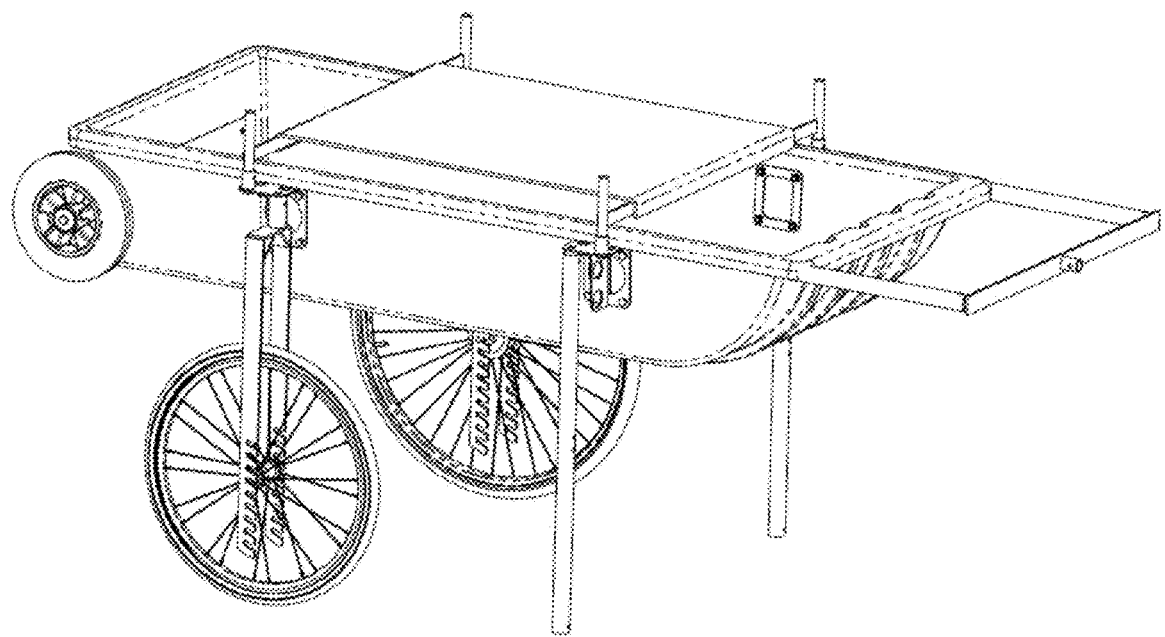
Figure 6C:
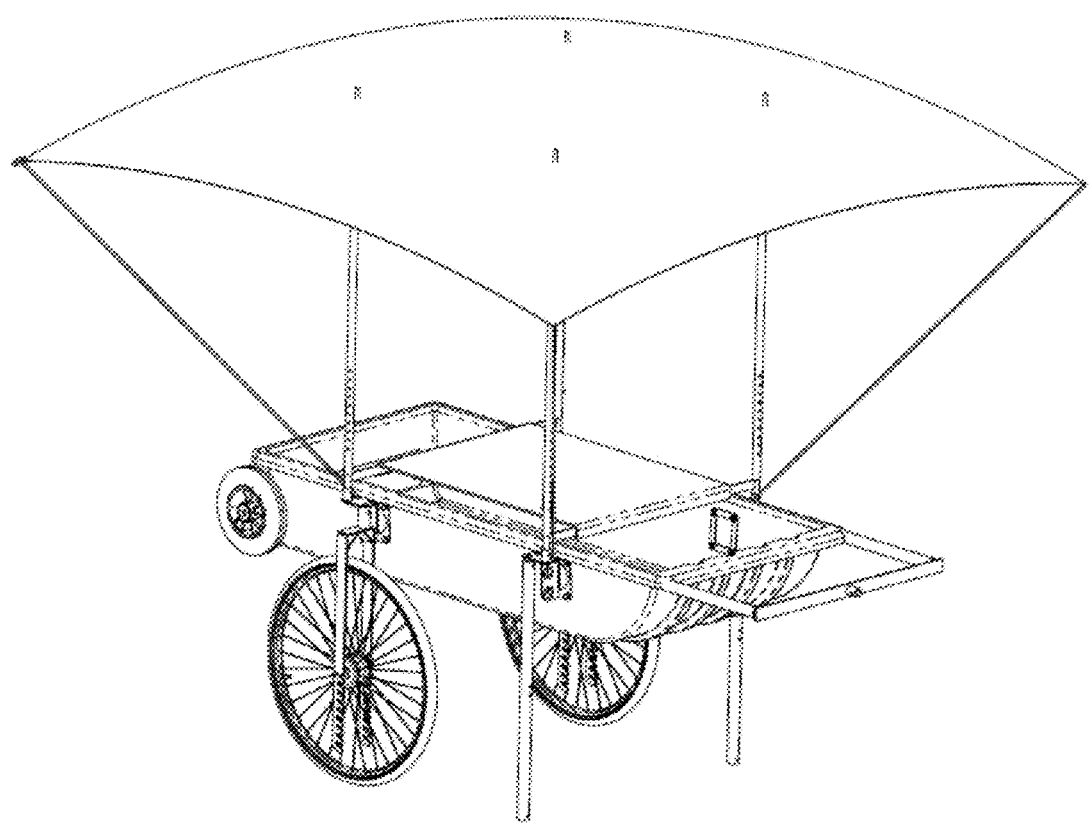
Figure 6D:
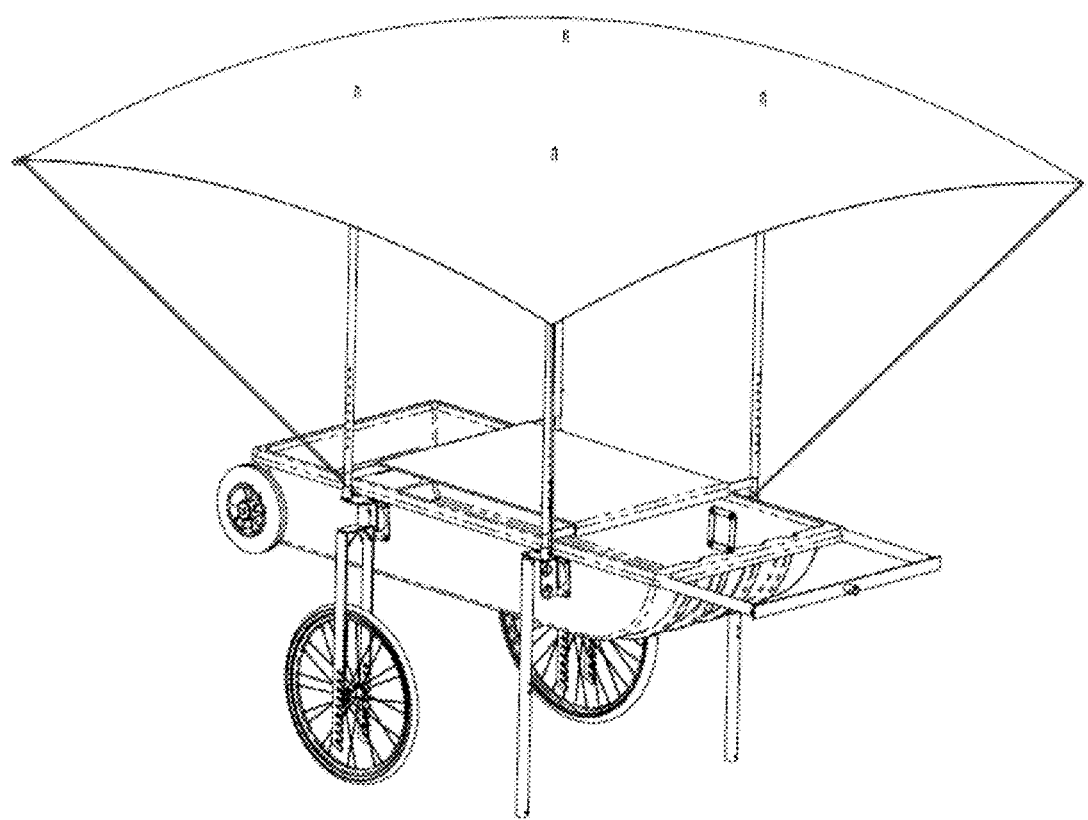

FIGS. 6B and 6D illustrate how notches 602 enable wheels of different sizes to be used. For example, two wheels of the same size may not be available in all situations. Cart 600 accordingly can be used with virtually any two wheels by positioning each wheel in the appropriate notch 602 so that cart 600 is level or at least substantially level.

Figure 6E:
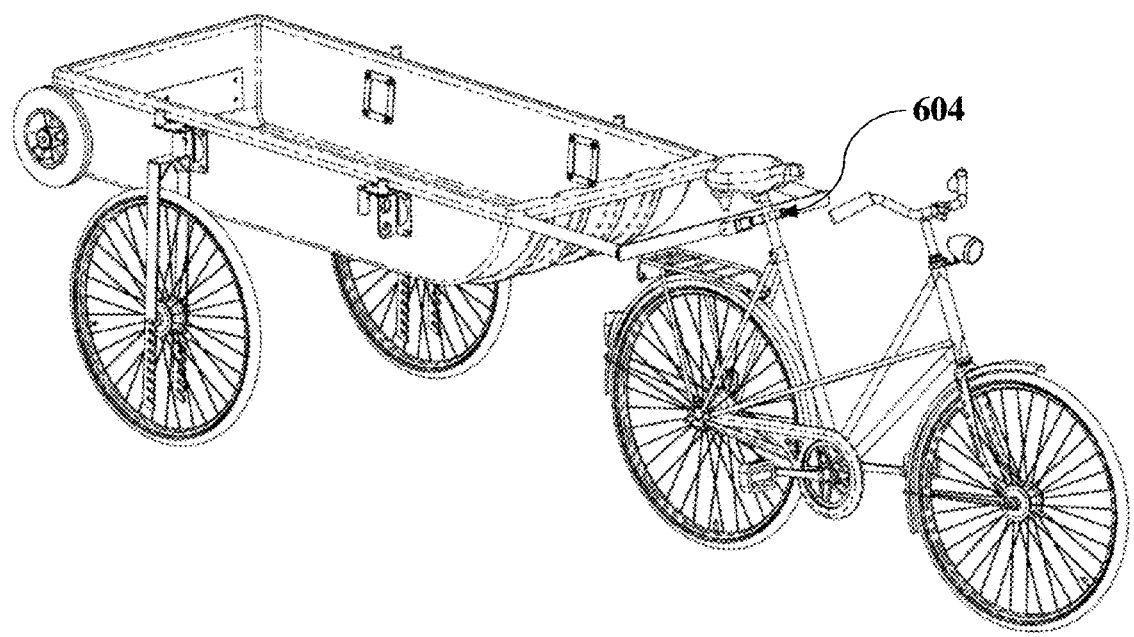
Figure 6F:
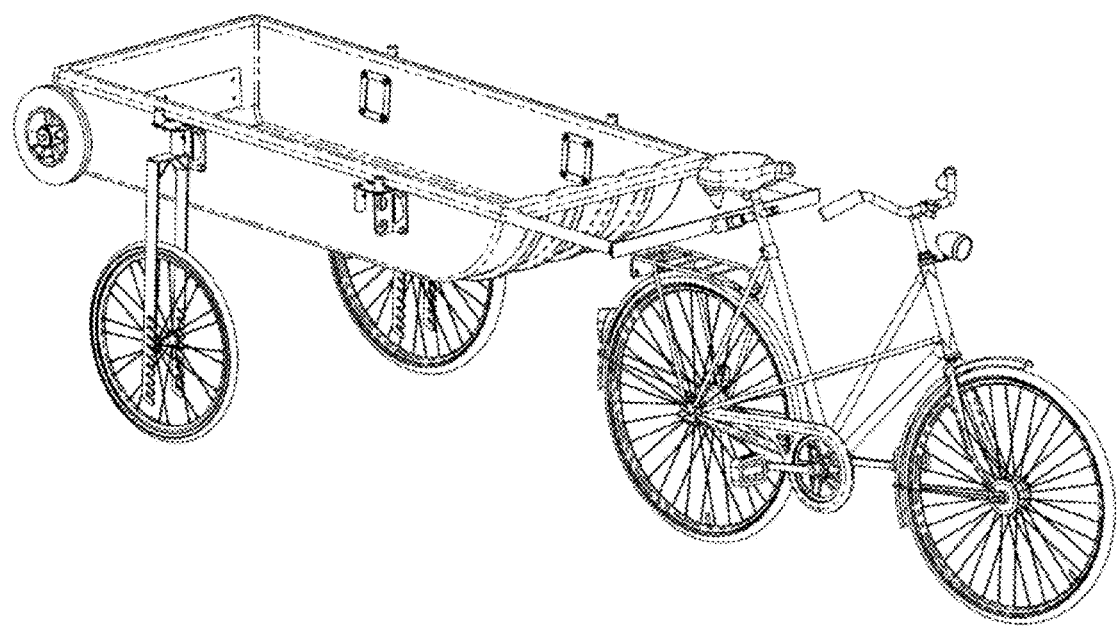
Figure 6G:
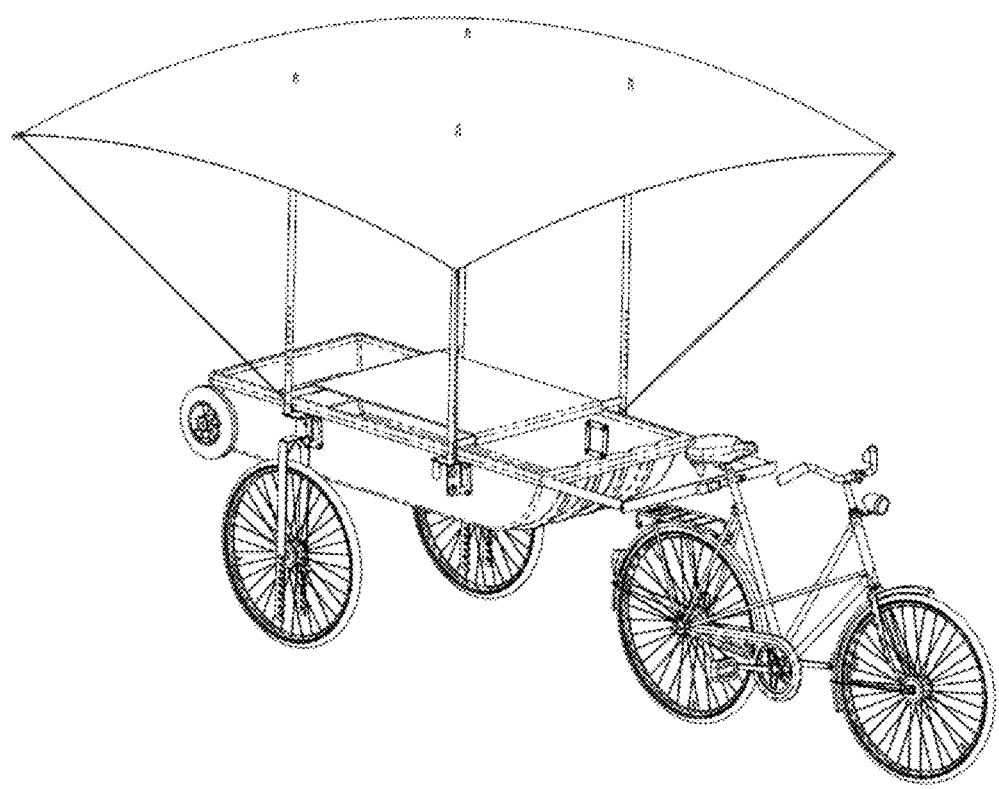
Figure 7A:
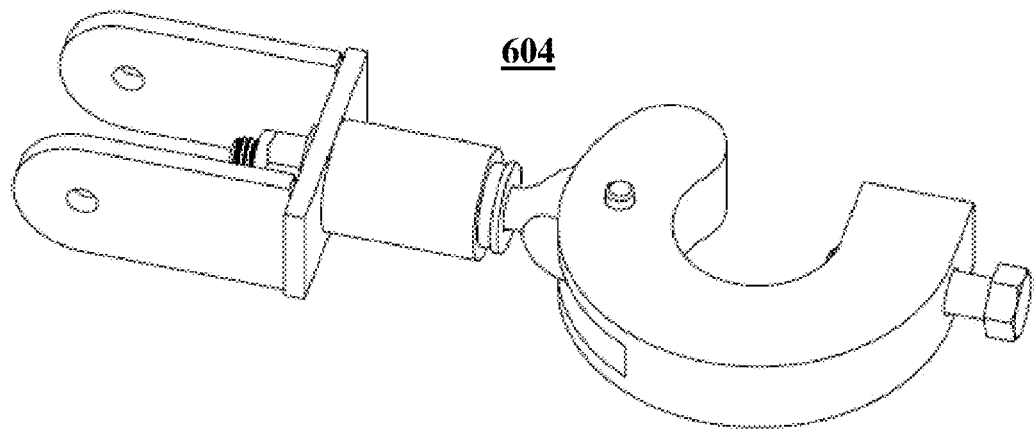
FIGS. 7A-7B illustrate a universal adapter for connecting the multi-function cart to a bicycle or vehicle as a trailer.
Figure 7B:
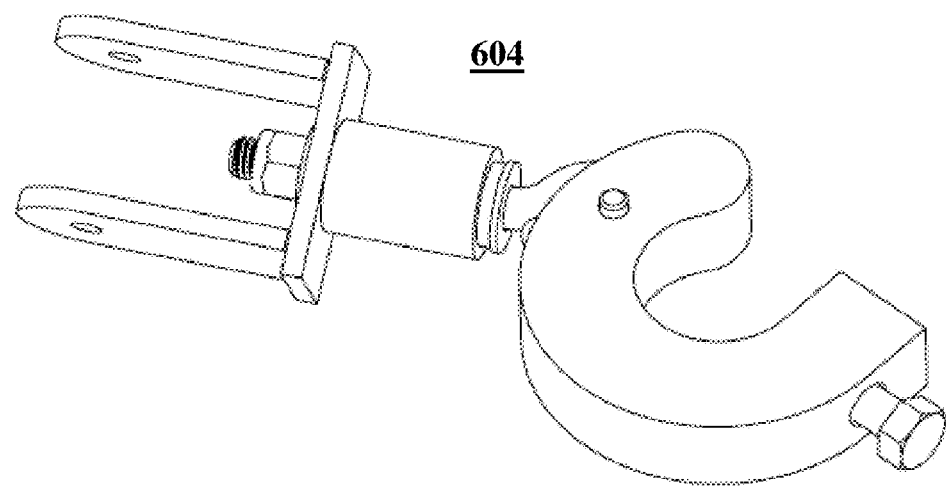

Cart 600 can be converted into a trailer using a universal adapter 604 (identified in FIG. 6E) as shown in FIGS. 6E-6G. Universal adapter 604, which is shown in more detail in FIGS. 7A-7B, is configured to connect to yoke bracket 603 and includes swivel joints to allow swiveling in vertical, horizontal, and rotational directions. Universal adapter 604 can be connected to a bicycle as shown in FIGS. 6E-6G or to another vehicle to allow cart 600 to be towed as a trailer. In some embodiments, braking means can be provided with cart 600. For example, forks 601 can be configured with brakes to apply braking to cart 600. Virtually any type of braking mechanism used with bicycles can be used as braking means, including disc brakes, rim brakes, drum brakes, spoon brakes, duck brakes, etc.

Figure 6H:
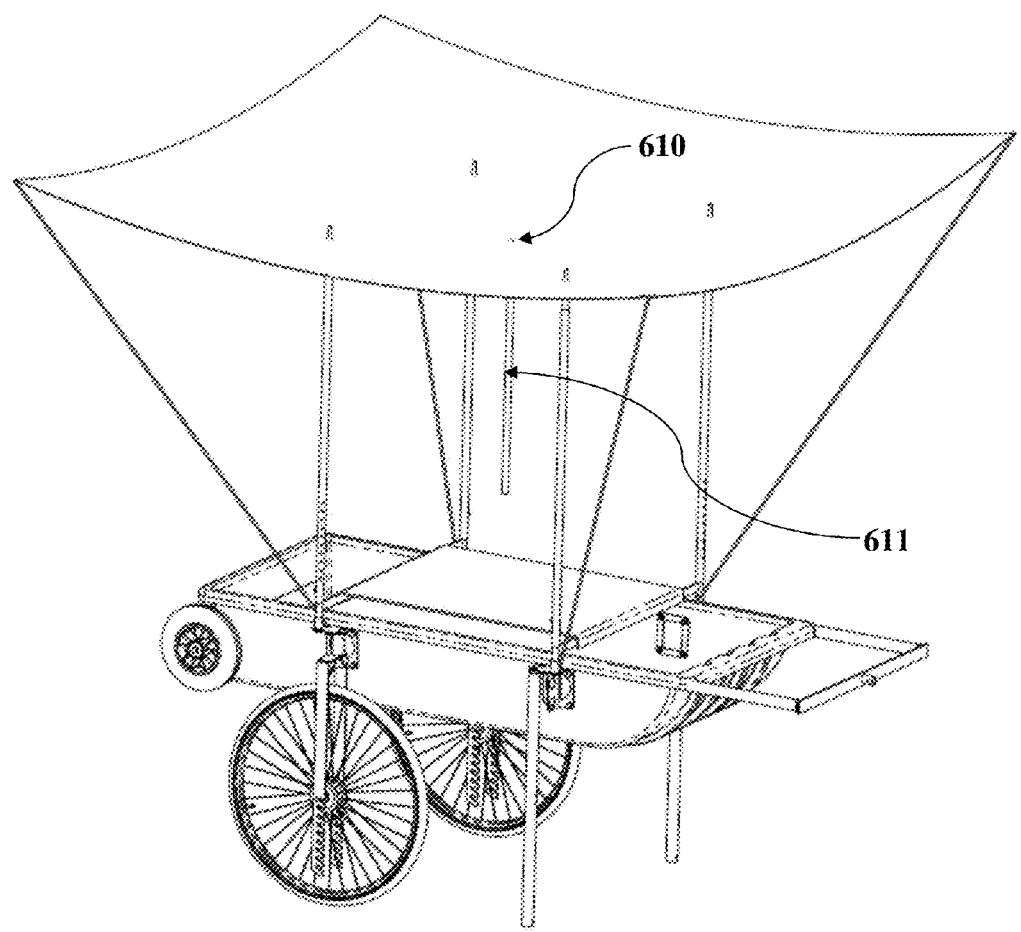

In some embodiments, canopy 402 can include an opening in or around the center. In such embodiments, canopy 402 can be used to collect water (e.g. rain water) by inverting canopy 402. For example, FIG. 6H illustrates canopy 402 being inverted on cart 600. Opening 610 in canopy 402 can include a valve, plug, or other means to selectively seal the opening to facilitate the draining of collected water from canopy 402 into another container. In some embodiments, a hose 611 can be attached to the opening to facilitate such draining. An in-line filter can be added to hose 611 for water treatment/purification purposes.

The embodiments illustrated in FIGS. 1A-7B are intended to represent illustrative embodiments only. Additional embodiments may be realized with features varying with respect to the features illustrated in FIGS. 1A-7B. For example, the foregoing Figures illustrate a particular size and shape of shell 101. Shell 101 may be varied in size and shape according to any of a variety of factors. For example, shell 101 intended to serve as a component of multi-function cart 100 to be used as an emergency preparedness kit for an individual or small family may be smaller than shell 101 intended to serve as a component of multi-function cart 100 to be used as an emergency preparedness kit for a large family, and both may vary in size or shape from shell 101 intended to serve as a component of multi-function cart 100 intended to be used by an aid organization in response to a disaster situation. Similarly, shell 101 and multi-function cart 100 may be sized and/or shaped differently and may be manufactured of differing components, durability, and/or strength depending on an intended use. For example, a multi-function cart 100 intended for repeated use and re-use in a recreational or camping setting may be constructed differently from a multi-function cart intended primarily for emergency preparedness and thus intended to primarily be used for stationary storage for long periods of time until an emergency situation occurs. The materials used for the various components of multi-function cart 100 may be selected according to the anticipated uses and needs accordingly. Thus, tubes 104, hub brackets 105 and the like may be formed from plastic in some embodiments, light-duty metal in other embodiments, heavy-duty metal in still other embodiments, or a combination in still further embodiments. Where appropriate, some components may be integrally formed, such as hub brackets 105 being integrally formed with shell 101 in a single injection molding process.

Embodiments may be provided that vary in construction, strength, and cost, depending on the anticipated uses. For example, it might be anticipated that a cart 100 intended for humanitarian relief purposes could be used with relative frequency, with a moderate to high likelihood of significant movement of cart 100 in various of its configurations, and with the intention of reusing cart 100 in multiple situations. In contrast, a cart 100 intended for emergency preparedness purposes might be anticipated to be used primarily for storage in anticipation of a disaster event, and might then be anticipated to be used once and moved only short distances. As may be appreciated, the demands on these two embodiments could be very different, and the methods and materials of construction could be varied accordingly to address the varying needs.

Similarly, while one embodiment of multi-function cart 100 might be provided with all the components necessary to assume all of the various configurations shown in FIGS. 1A-7B, a user may not have a need for all such possible configurations of multi-function cart 100. Such a user may instead purchase and use an embodiment capable of assuming only a subset of such configurations, thereby reducing the cost and weight of cart 100.

Multi-function cart 100 may be modified in certain ways to provide additional strength, functionality, durability, and the like. Although such modifications will be apparent from the description and appended Figures, some potential modifications will be discussed herein with respect to FIGS. 8A-10G. For example, FIGS. 8A-8D illustrate an alternate embodiment of cart 100. In this embodiment, wheel assembly 103 is provided with several modifications that may serve to increase the durability of cart 100. A first modification is that the size of the wheels is increased when compared with the version of FIGS. 1A-1D. The increase in wheel size also involves a different placement of the wheel axle on shell 101 to provide sufficient clearance between the respective wheels when two shells 101 are assembled in the configuration shown in FIG. 8A.

Figure 8A:
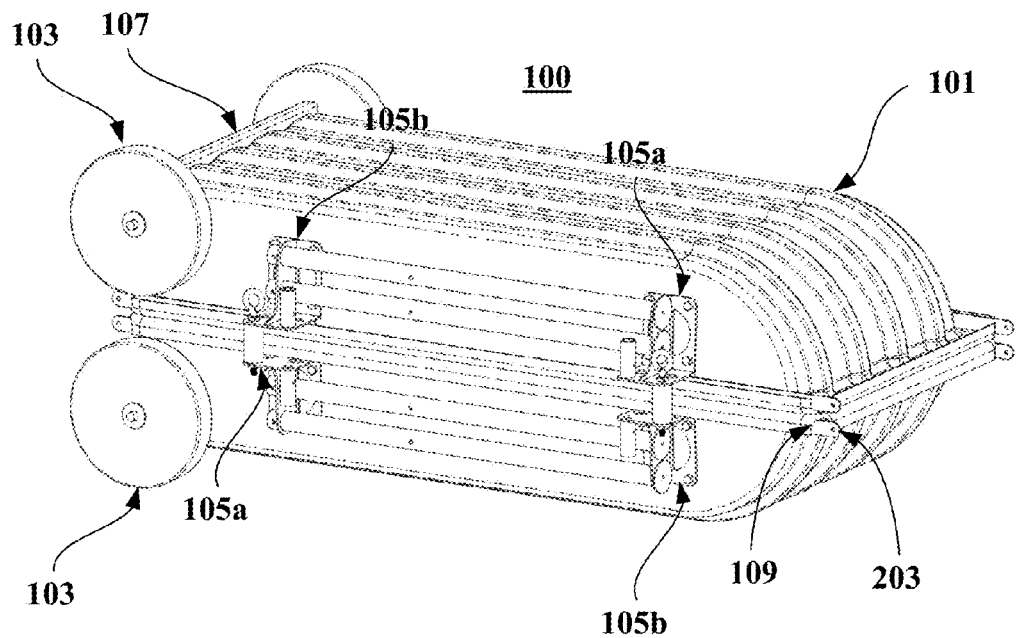
FIGS. 8A-8E illustrate a multi-function cart according to one or more embodiments of the invention.

The increased size of the wheels serves to elevate a portion of shell 101 above an underlying surface, such that when shell 101 is being translated across the underlying surface irregularities in the surface are less likely to impact, damage, or impart wear to shell 101. The larger wheels therefore serve to improve the life of shell 101. Additionally, as the rear bottom corner of shell 101 (the corner proximate wheel assembly 103) is in many ways the corner most prone to damage, an axle block 107 extends downward (when shell 101 is disposed horizontally with the wheels contacting an underlying surface) at the back of shell 101 as shown in FIG. 8A to provide additional impact protection to a lower rear portion of shell 101. A corresponding inner wheel assembly brace 112, best visible in cutaway FIG. 10B and in FIG. 10J, may be secured through shell 101 to axle block 107 to further strengthen and protect this area of shell 101.

Figure 8B:
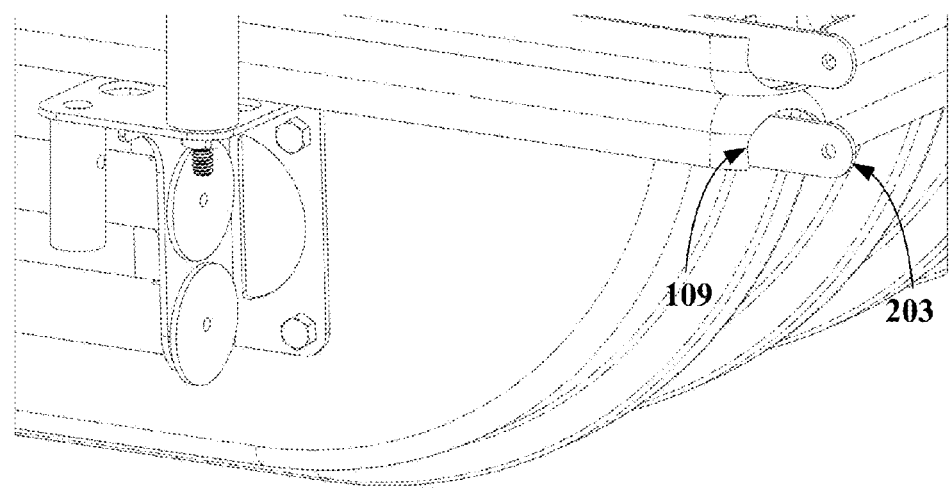
Figure 8C:
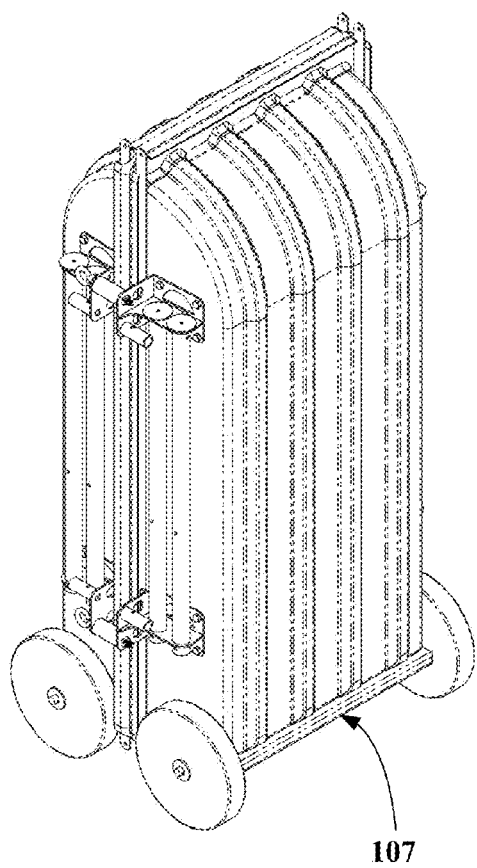
Figure 8D:
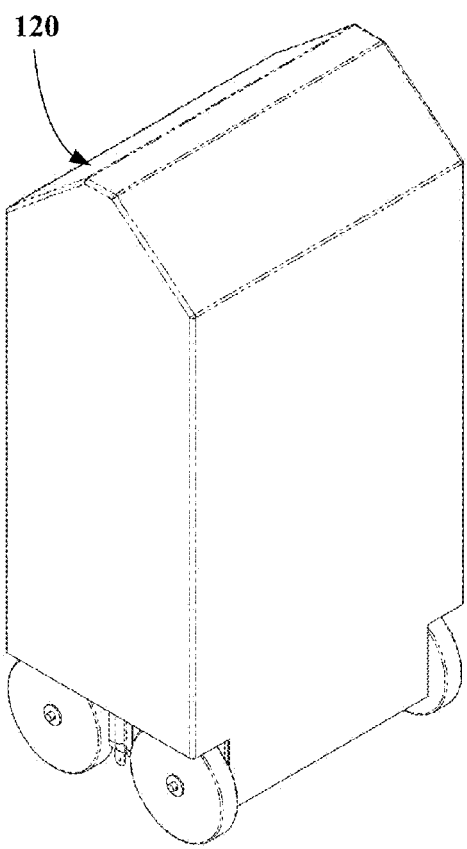

As may be seen in FIG. 8C, the increase in size of the wheels may also serve to further elevate shells 101 of cart 100 when cart is disposed in a vertical position. This additional elevation may allow cart 100 to be pushed in the vertical position over terrain that would be more difficult to navigate with smaller wheels while protecting the bottom corners of vertically oriented cart 100. Where cover 120 is to be used with such an embodiment, cover 120 may be modified to account for the larger size of the wheels, either by flaring cover 120 at the bottom, or by providing cover with appropriate cutouts, as shown in FIG. 8D.

Figure 8E:
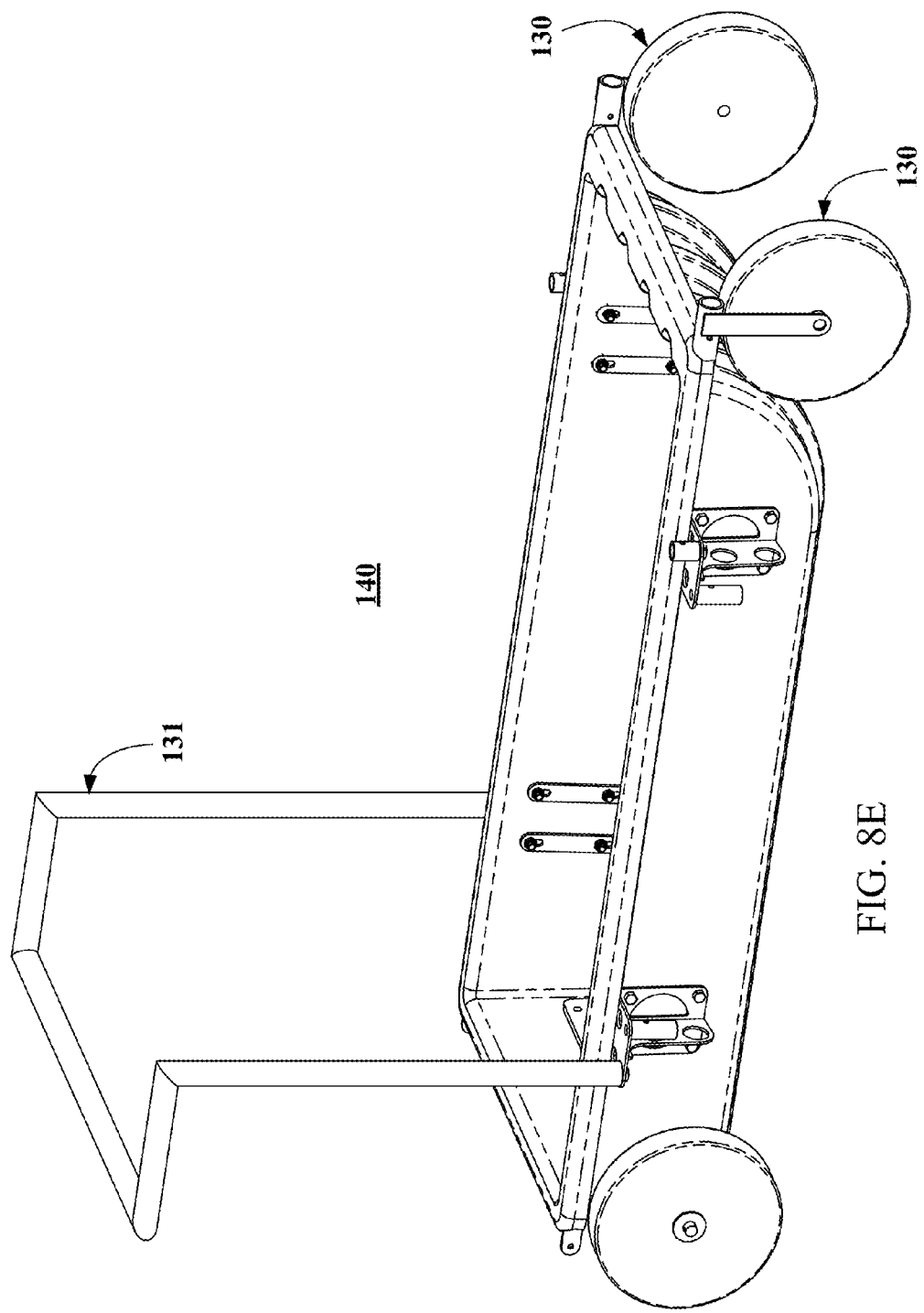
Figure 10A:
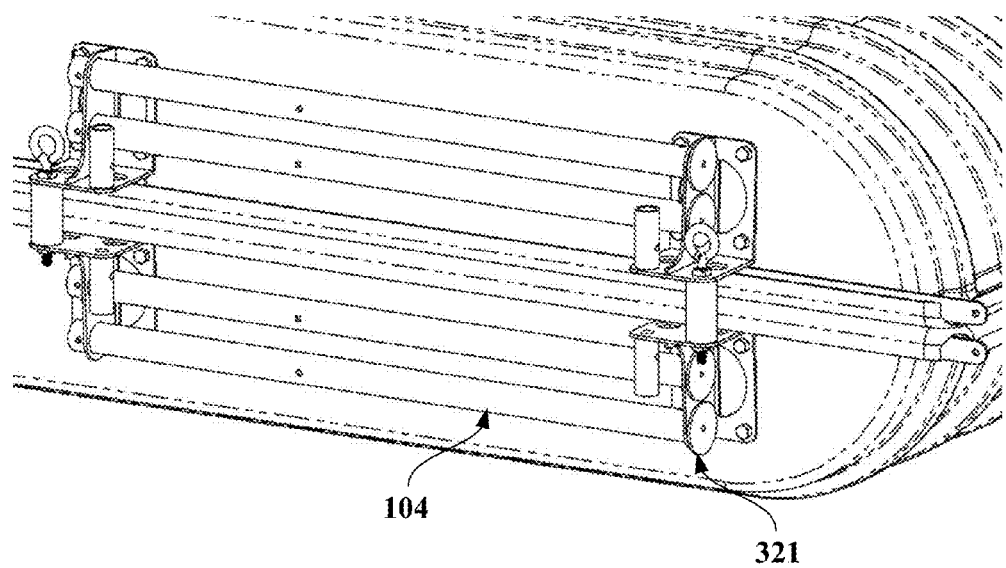
FIGS. 10A-10J illustrate various configurations of embodiments of the multi-function cart.
Figure 10B:
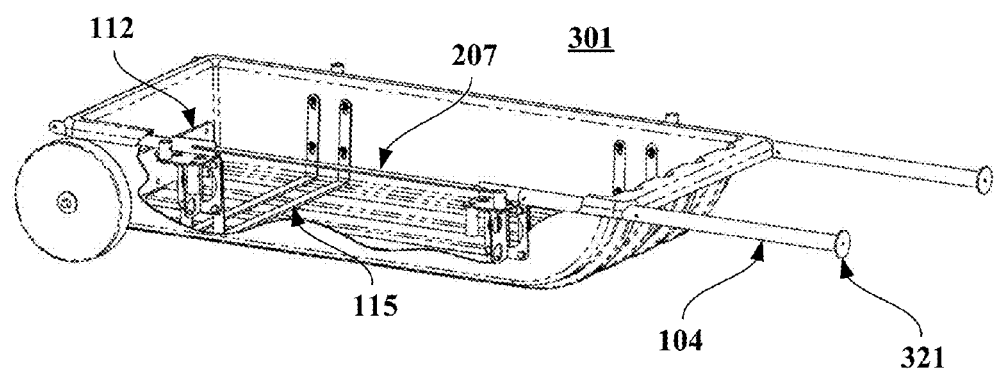

Shell 101 as shown in FIGS. 8A and 10B may be configured with an additional set of wheels or casters 130 attached to front hub brackets 105 and/or by engagement with the portions 203 of front hub brackets 105, as shown in FIG. 8E. The additional set of wheels or casters 130 may be configured to elevate a front portion of shell 101 an amount generally corresponding to the elevation of the rear portion of shell 101 by wheel assembly 103. In this manner, shell 101 may serve as a four-wheeled horizontally disposed low-slung hand truck 140. Such a configuration could be pulled using handles as discussed above, using tubes 104 configured as side stakes, or using one or more ropes secured to any portion of shell 101, including various locations on hub brackets 105. Additionally, such a configuration could be pushed or pulled using handle 131, which is illustrated in FIG. 8E as being formed as a unitary piece configured to attach to adapters 106b, but could also be configured as multiple parts, such as a horizontal handle portion configured to connect to tubes 104.

As discussed previously, in certain embodiments of multi-function cart 100, portion 203 of hub brackets 105 may be extended so as to protrude beyond shell 101 through openings 109. Such embodiments are illustrated in FIGS. 8A and 8B. Alternatively, portion 203 of hub brackets 105 may extend nearly to openings 109 without protruding beyond shell 101. In some cases, portions of shell 101 may be cut back to better expose the ends of portions 203 for ease in connectivity thereto. The extension of portion 203 serves to strengthen the connection between tubes 104 when used as handles and shell 101, and eliminates any need for holes 110 and receptacles 111 for pinning tubes 104 to shell 101, as tubes 104 may now easily be pinned directly to portions 203 at the end of portions 203 extending near or through openings 109.

Figures 9A, 9B:
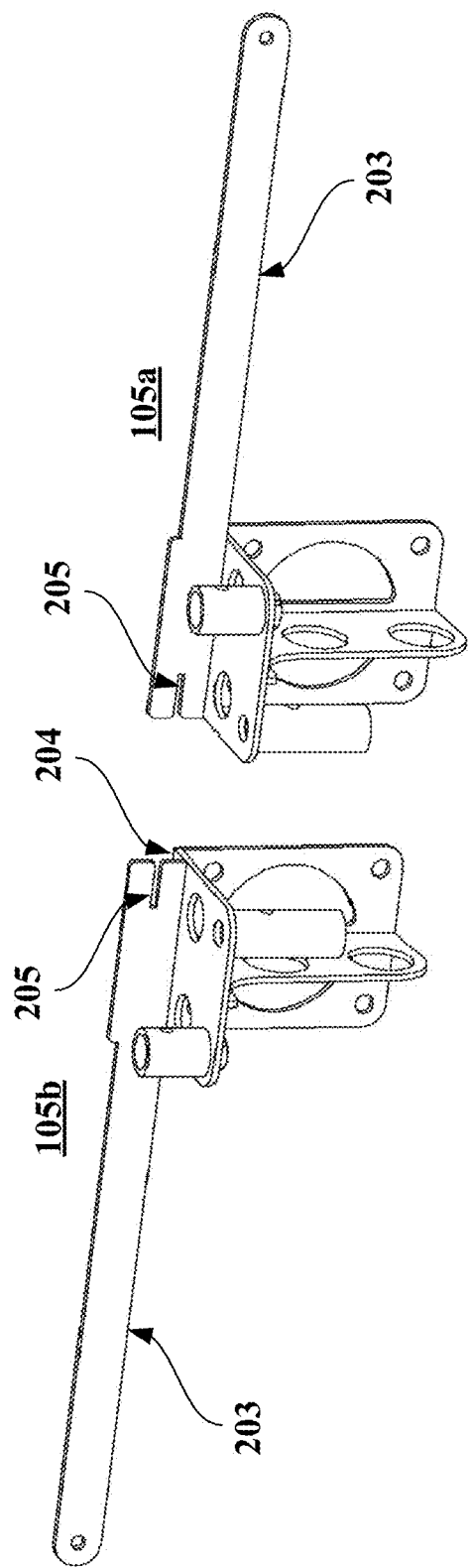

FIGS. 9A-9F and 10B illustrate modifications to hub brackets 105 that provide the extended portions 203 as well as additional stability and support to shell 101. One variation of hub brackets 105a-b is shown in FIGS. 9A-9B. In this variation, portion 203 is extended as has been discussed above when compared to the variation of FIGS. 2A-2B. In addition, notches 205 are provided in hub brackets 105*a-b* to permit a stiffening bar 207 to be inserted into the notches 205 so as to extend between hub bracket 105*a* and hub bracket 105*b* when hub brackets 105*a-b* are attached to shell 101 as shown in FIG. 10B. Stiffening bar 207 serves to stiffen and strengthen the side of shell 101, such that as shell 101 is loaded it is more resistant to deformation that might otherwise occur. Stiffening bar 207 used with hub brackets 105*a-b* of FIGS. 9A-9B and 10B may be an elongate flat plate with corresponding notches to engage notches 205.

Figure 9E:
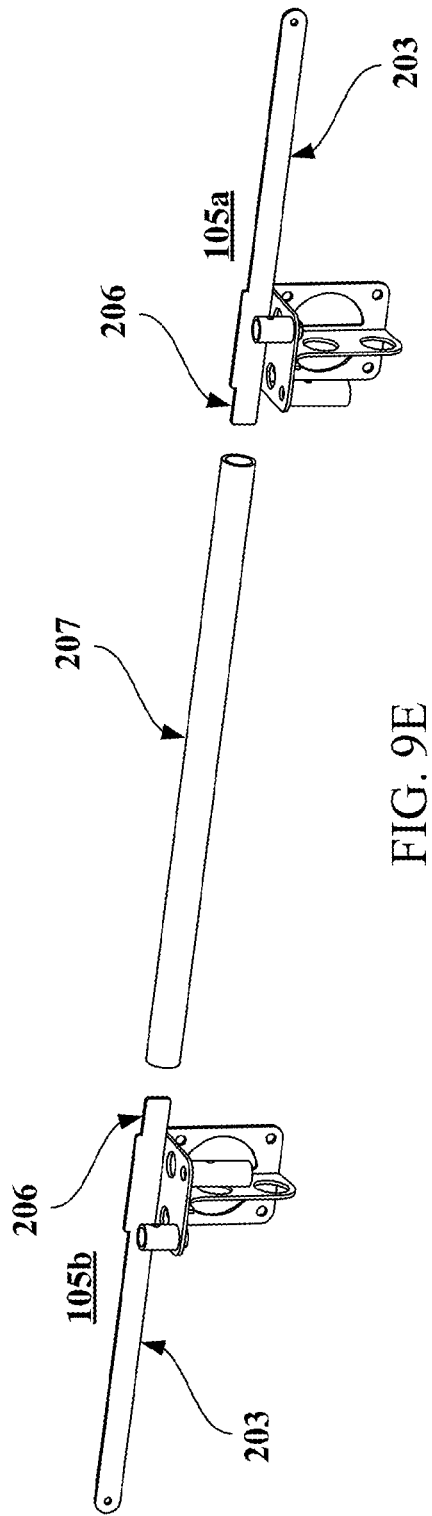
Figure 9F:
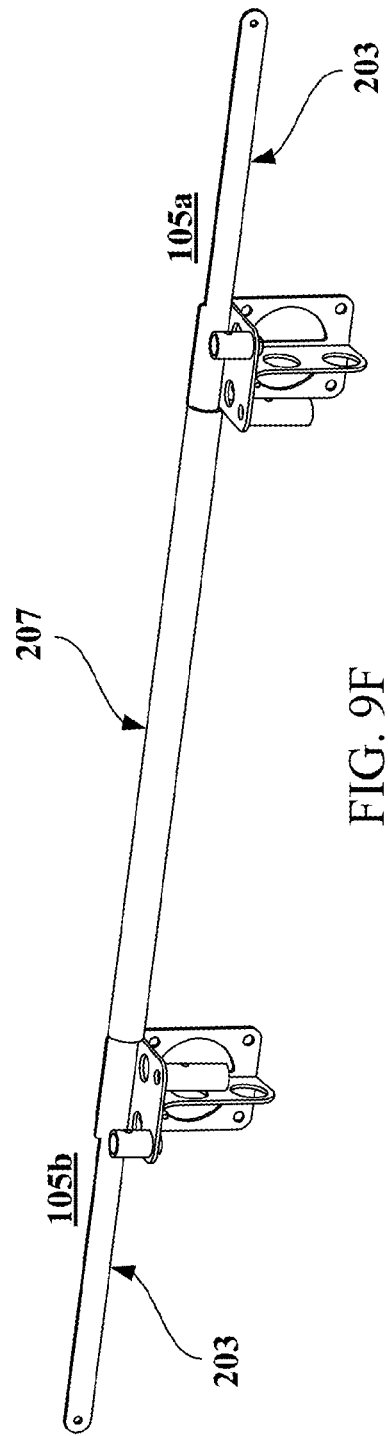

Another variation of hub brackets 105*a-b* and stiffening bar 207 is shown in FIGS. 9C-9F. In this variation, portions 203 are extended in identical fashion to the embodiment of FIGS. 9A-9B. The variation of FIGS. 9C-9F does not, however, have notches 205. Instead, portions 206 are provided opposite portions 203. Portions 206 are configured to receive a tube-form stiffening bar 207 that engages portion 204 in similar fashion to that in which tubes 104 engage portions 203. Thus, as shown in FIG. 9E, stiffening bar 207 can be positioned in between hub bracket 105*a* and hub bracket 105*b* and then portions 206 may be inserted into stiffening bar 207 as shown in FIG. 9F during assembly of hub brackets 105*a-b* to shell 101.

As may be appreciated from the Figures, assembly of stiffening bar 207 and hub brackets 105*a-b* to shell 101 substantially prevents stiffening bar 207 from disengaging hub brackets 105*a-b*, so there is no need to fixedly attach (e.g. weld) stiffening bar 207 to hub brackets 105*a-b*. Indeed, allowing a small amount of play between stiffening bar 207 and hub brackets 105*a-b* may ease assembly of hub brackets 105*a-b* and stiffening bar 207 to shell 101. Nevertheless, embodiments of the invention embrace manufacturing or forming the hub brackets 105*a-b* and any version of stiffening bar 207 as a unitary single hub bracket 105, which will provide the same functionality discussed herein.

While not specifically illustrated in the Figures, it will be appreciated that the benefits of stiffening bar 207 may be accomplished with embodiments of hub brackets 105*a-b* that do not incorporate extended portions 203. Thus, the version of hub brackets 105*a-b* illustrated in FIGS. 2A-2B may be modified to include notches 205 or portions 206. Embodiments of the cart may include differing hub brackets 105 such that extended portions 203 are present on only some (e.g. the front) hub brackets 105, and thus versions of hub brackets 105 illustrated in FIGS. 9A-9F may be matched with modified versions of hub brackets 105 illustrated in FIGS. 2A-2B to allow for use of stiffening bar 207.

Hub brackets 105*a-b* may be further modified according to the specific manners in which cart 100 is anticipated to be used. For example, if it is anticipated that cart 100 is never to be used in a manner in which it is anticipated that tubes 104 or other components are to be downwardly disposed, adapters 106*a* may be omitted from hub brackets 105. Similarly, if it is anticipated that cart 100 is never to be used in a manner in which tubes 104 or other components are to be upwardly disposed, adapters 106*b* may be omitted from hub brackets 105. If an embodiment requires fewer tubes 104, hub brackets 105 may be modified to include only one hole 201 each. Similarly, if an embodiment requires additional tubes 104, more than two holes 201 may be provided in hub brackets 105. Alternatively, hub brackets 105 may be modified to store one or more tubes 104 in a different fashion (in addition to holes 201 or as an alternative to holes 201) such as with clips, ties, or other storage devices. Alternatively, hub brackets 105 may be modified to have no tube storage, and tubes 104 may be omitted or stored in shell 101. Thus, the specific illustrated embodiments are intended not to be limiting but only to illustrate concepts and functionality that may be provided using various versions of hub brackets 105.

FIGS. 10A-10J illustrate other variations or configurations of cart 100 that may be utilized in certain embodiments. FIG. 10A shows a modified version of tubes 104. In this version, tubes 104 are still interchangeable, but tubes 104 all have feet 321 fixedly attached thereto, such as being integrally formed, welded, etc. The fixed attachment of feet 321 to tubes 104 reduces the possibility of loss of feet 321, allows for tubes 104 to be retained in holes 201 by pinning or otherwise securing at one end only, and reduces the number of steps necessary to set up shell 101 as elevated work area 304. Tubes 104 as modified in the manner shown in FIG. 10A may still be used in essentially all the manners described above, as is shown in part in FIGS. 10B-10J. Where necessary, slight modifications may be made to tubes 104 and other engaging components to provide such functionality (such as by providing an additional set of holes for pinning components to tubes 104.

For example, FIG. 10B shows a cutaway view of shell 101 configured as wheeled cart 301 using tubes 104 with fixedly attached feet 321. Wheeled cart 301 of FIG. 10B can be used essentially identically as wheeled cart 301 of FIG. 3A.

Figure 10C:
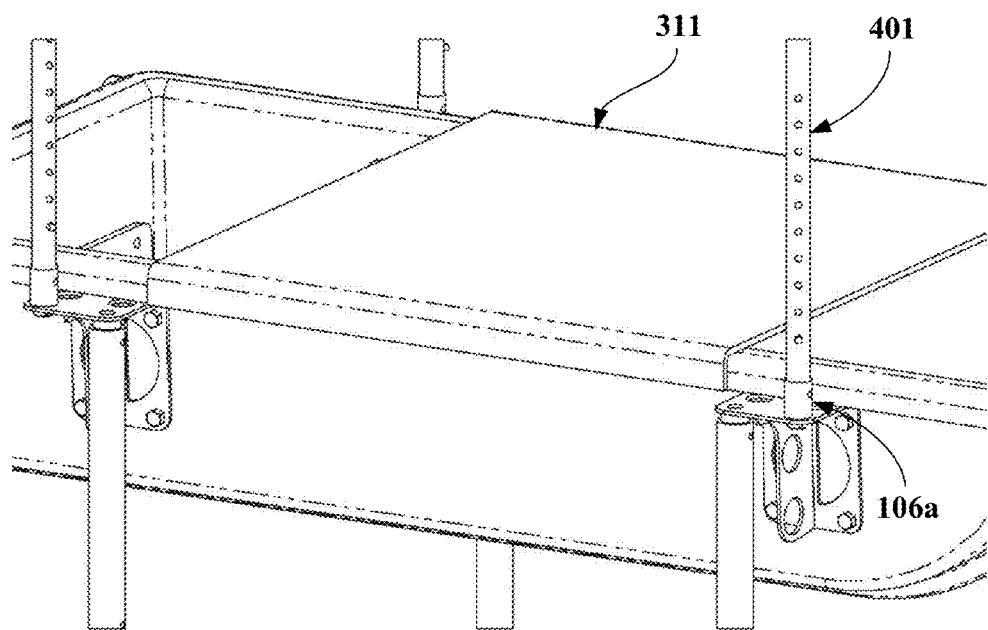
Figure 10D:
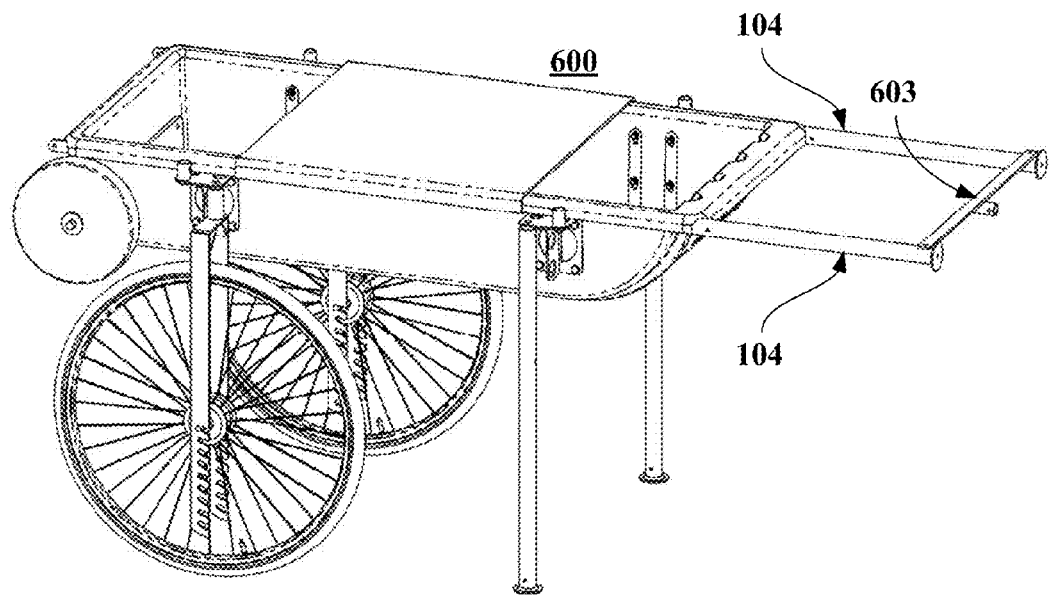

The cutaway view of FIG. 10B shows an additional modification from those previously discussed. In this embodiment, internal support ribs 115 extend along an inner surface of shell 101 between hub brackets 105 on opposite sides of shell 101. Internal support ribs 115 serve to strengthen and stiffen shell 101, and essentially provide a similar rigidity to shell 101 as shell support bars 310. While shell support bars 310 may still be used, they may also be omitted from some such embodiments, especially when internal support ribs 115 are used in conjunction with stiffening bars 207. Where shell support bars 310 are not used, surface 311 may be directly attached to or rest on sides of shell 101 (e.g. on lip 108), as shown in FIG. 10C. FIG. 10C also illustrates how telescoping tubes 401 may directly attach to adapters 106*a* (or using a separate insert) rather than to shell support bars 310 in the manner shown and discussed with respect to FIG. 4B.

Figure 10E:
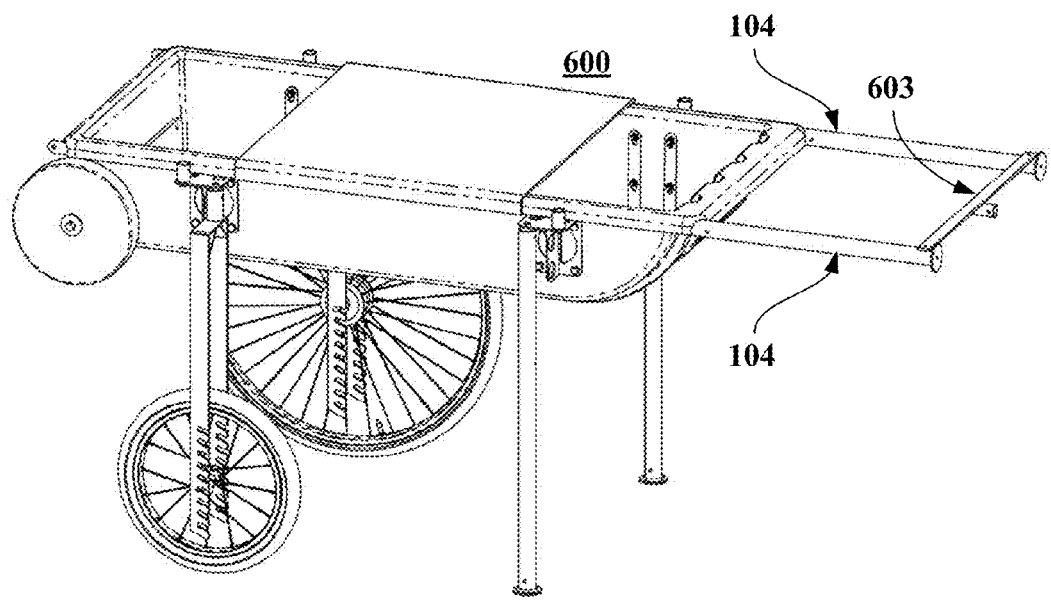
Figure 10F:
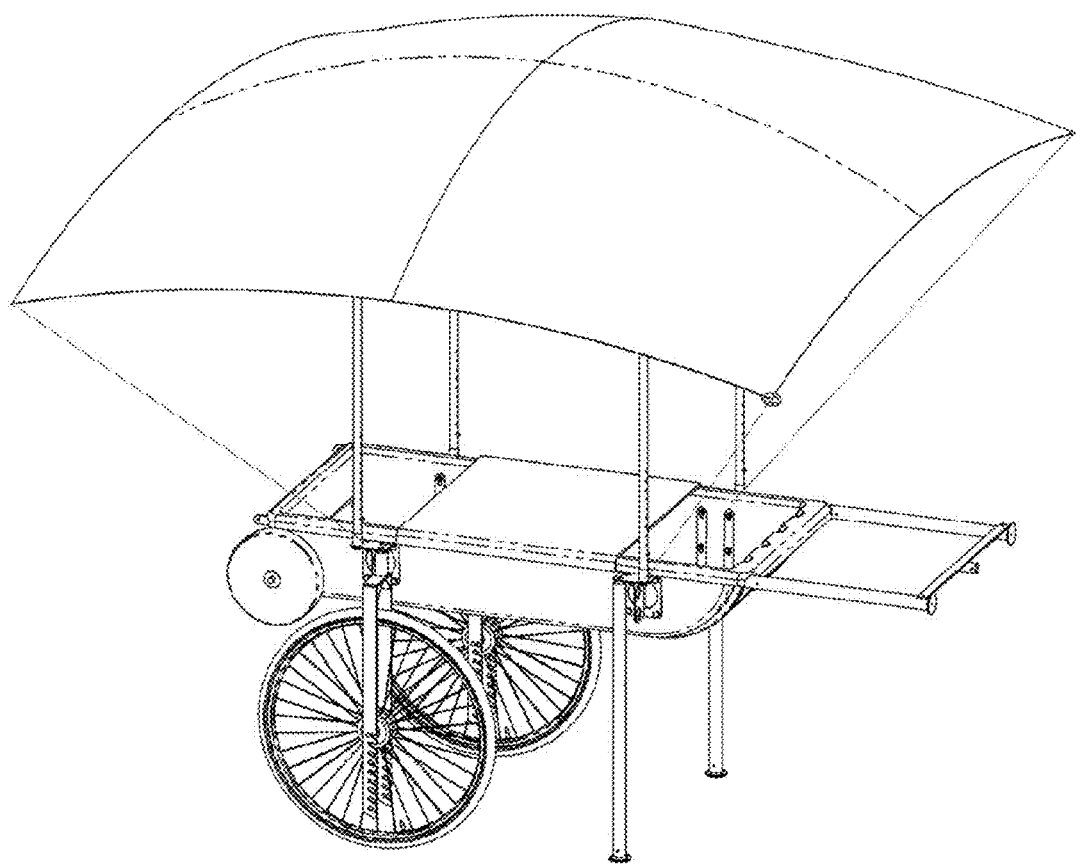
Figure 10G:
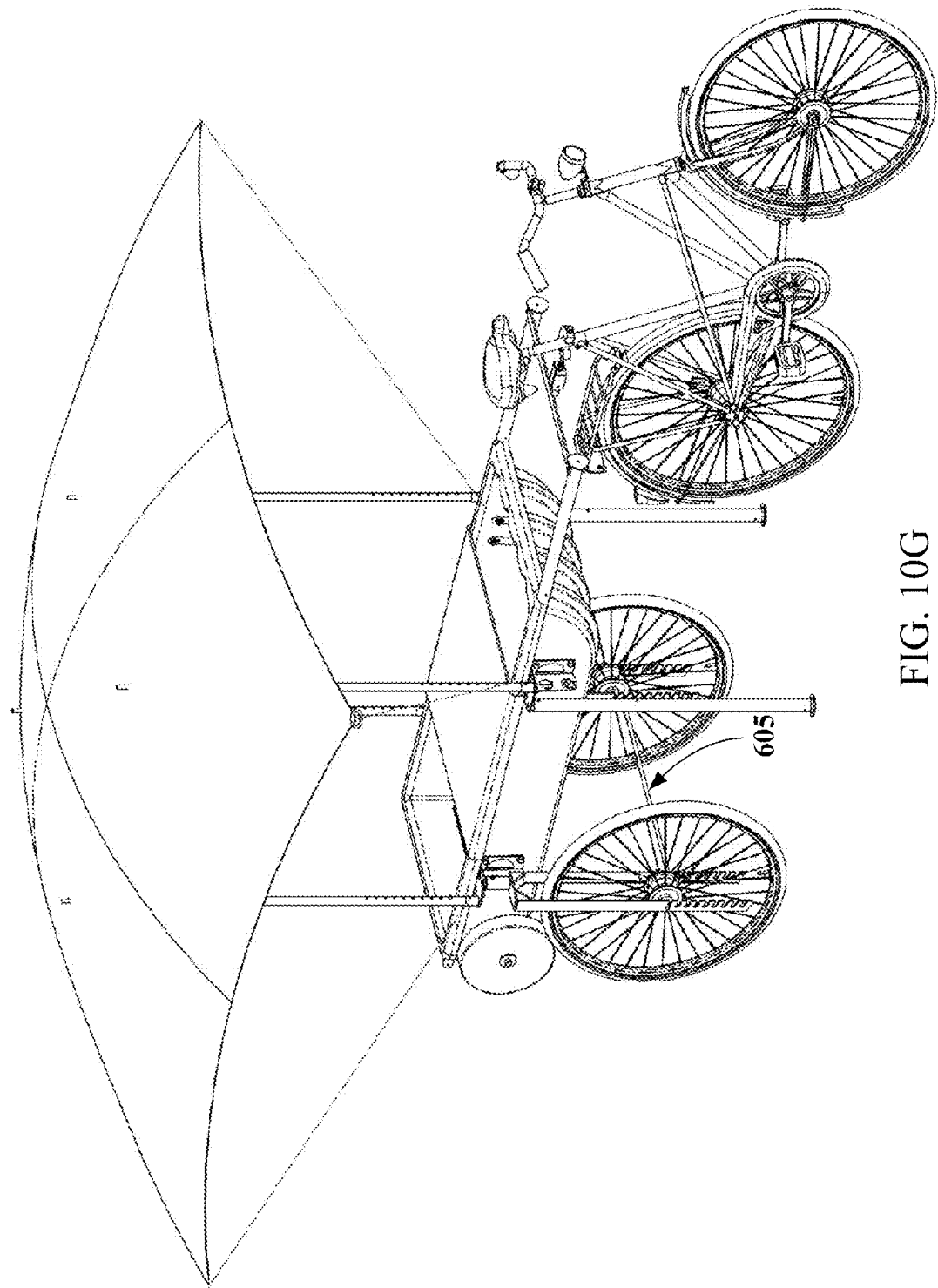
Figure 10H:
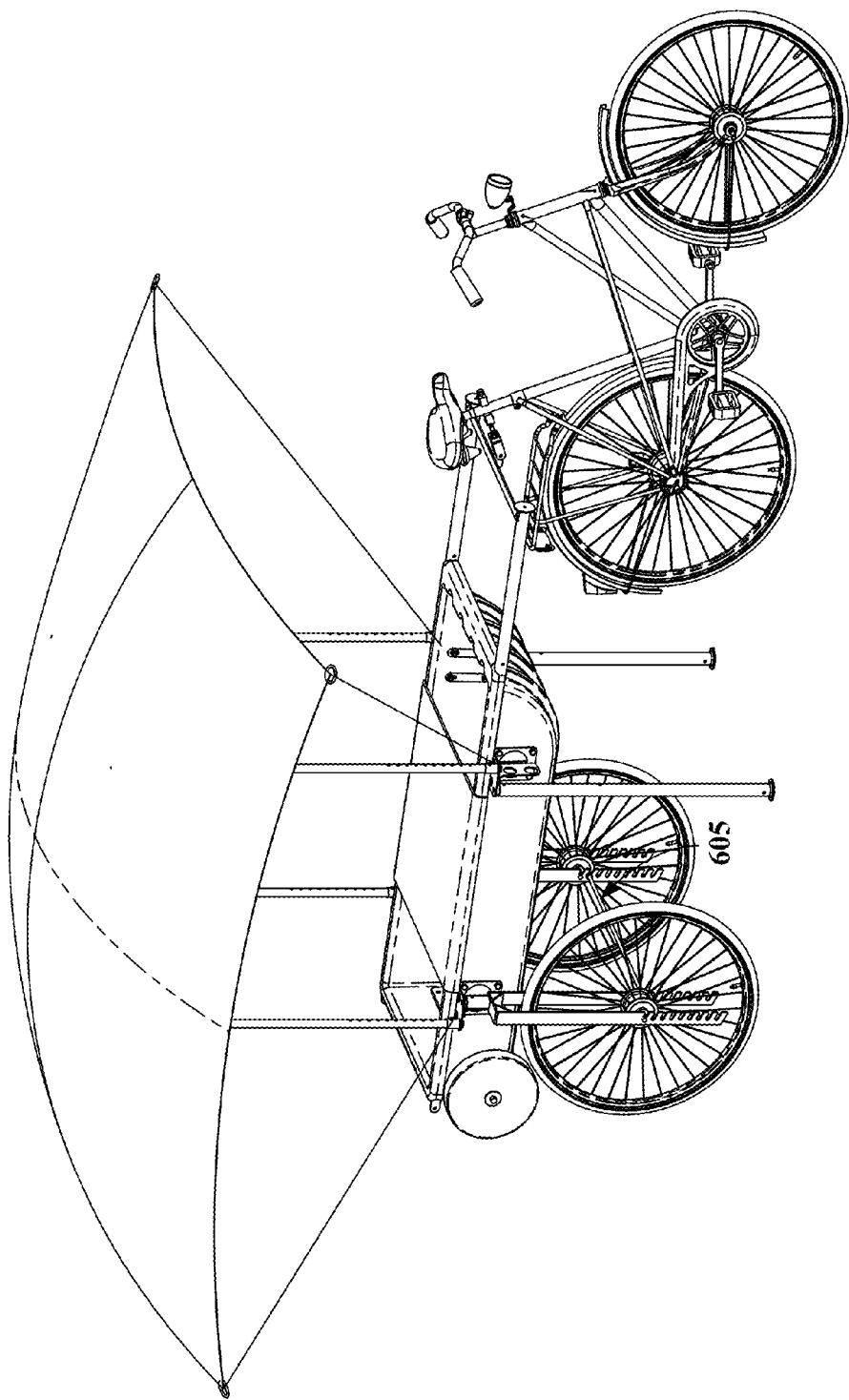
Figure 10I:
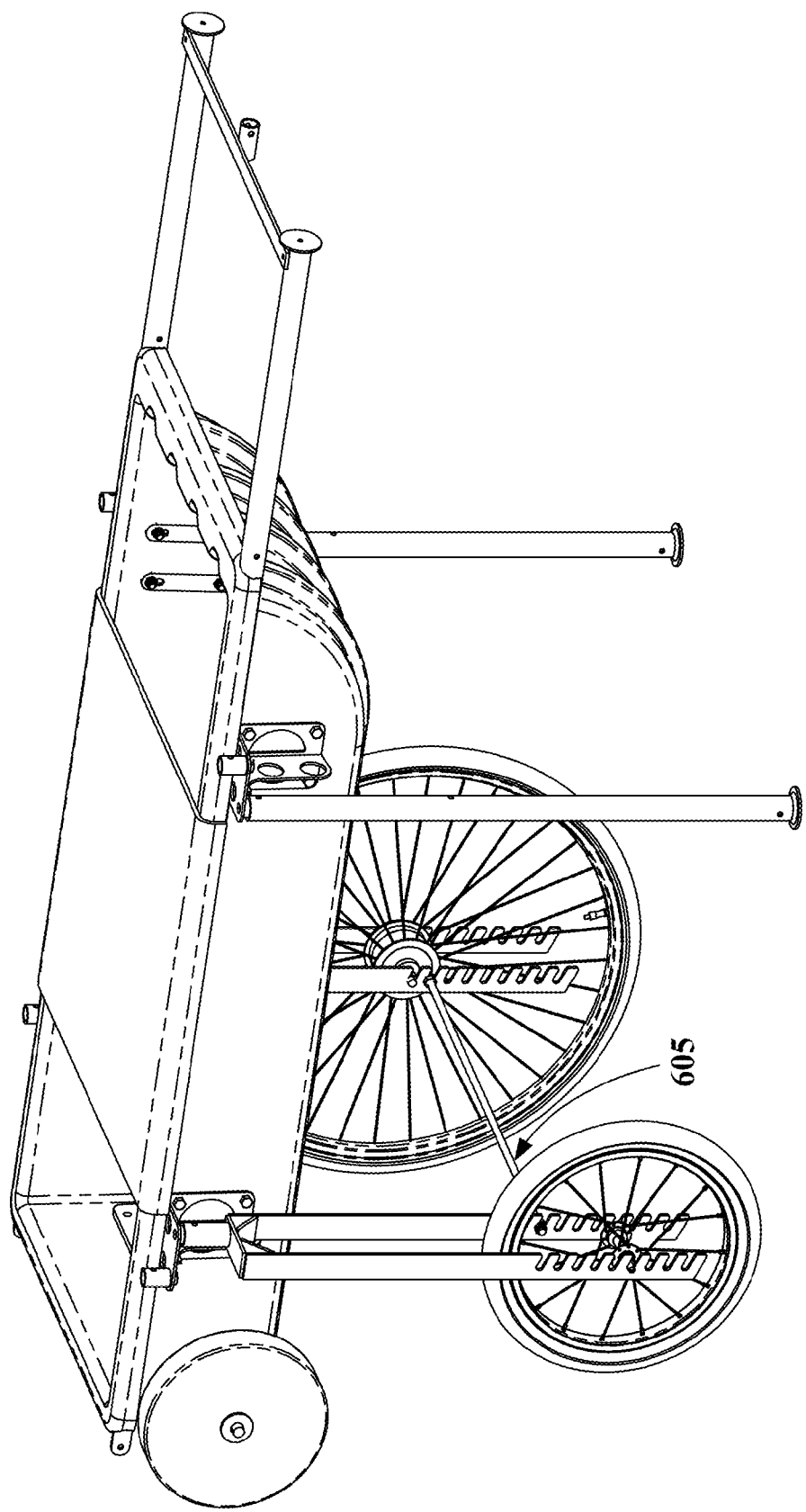
Figure 10J:
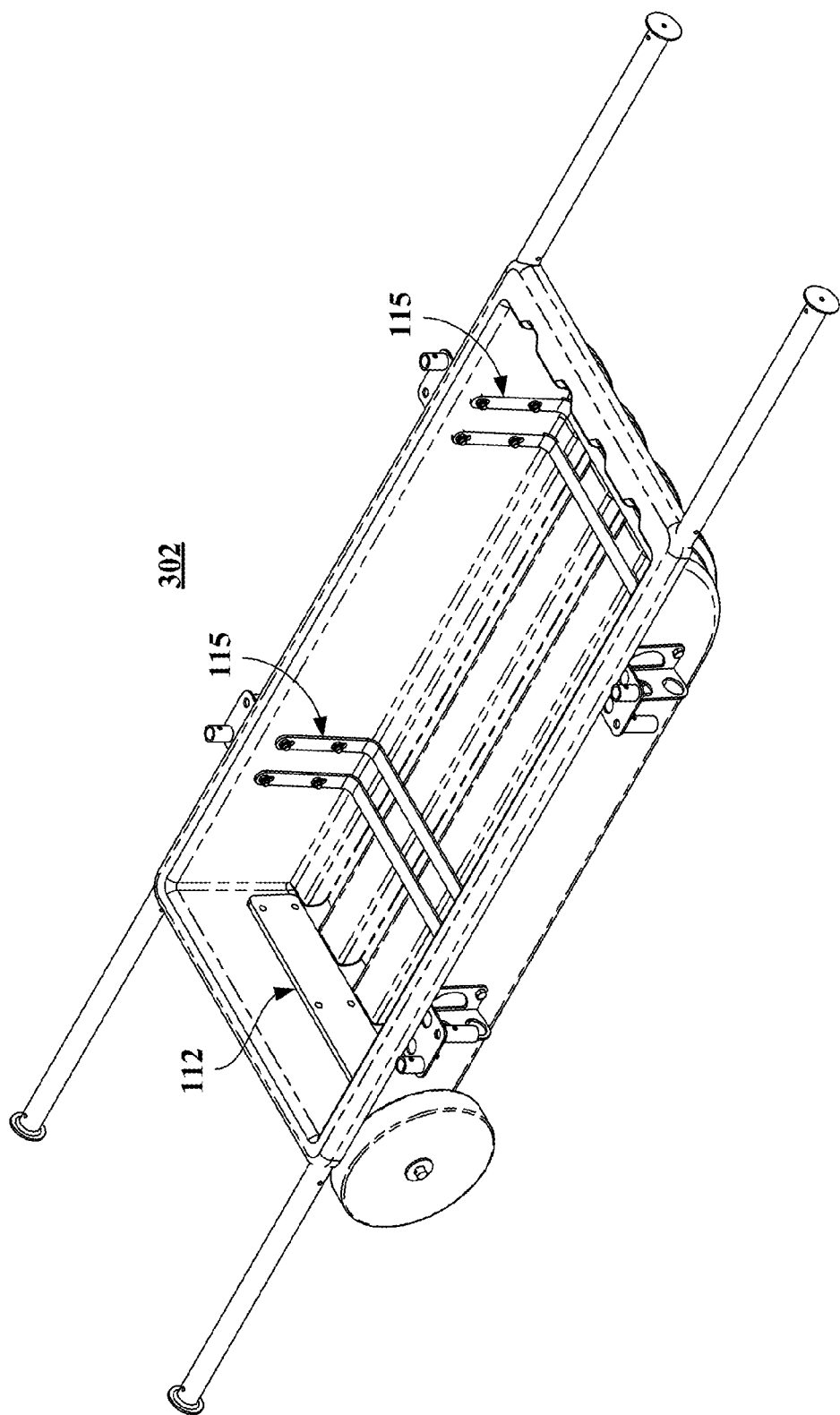

FIGS. 10D-10I show an alternate version of yoke bracket 603 configured to function with tubes 104 having fixedly attached feet 321. The functionality discussed with respect to FIG. 6A is fully maintained. FIG. 10E also shows a more pronounced example of how notches 602 permit the use of differently sized wheels with yoke brackets 603 when shell 101 is configured as cart 600. FIGS. 10F and 10J serve to illustrate that the functionality discussed with respect to FIGS. 6C-6H is fully maintained in these varying embodiments. Additionally, FIGS. 10G-10I illustrates a fork stabilizer 605 extending between the forks 601 to provide additional rigidity, stability and support to forks 601 and cart 600. Fork stabilizer 605 may take any of a variety of forms, including a rod, a threaded rod, and the like, and may be attached to forks 601 using any appropriate form of attachment, including by connection to corresponding notches 602 on forks 601.

Figure 11A:
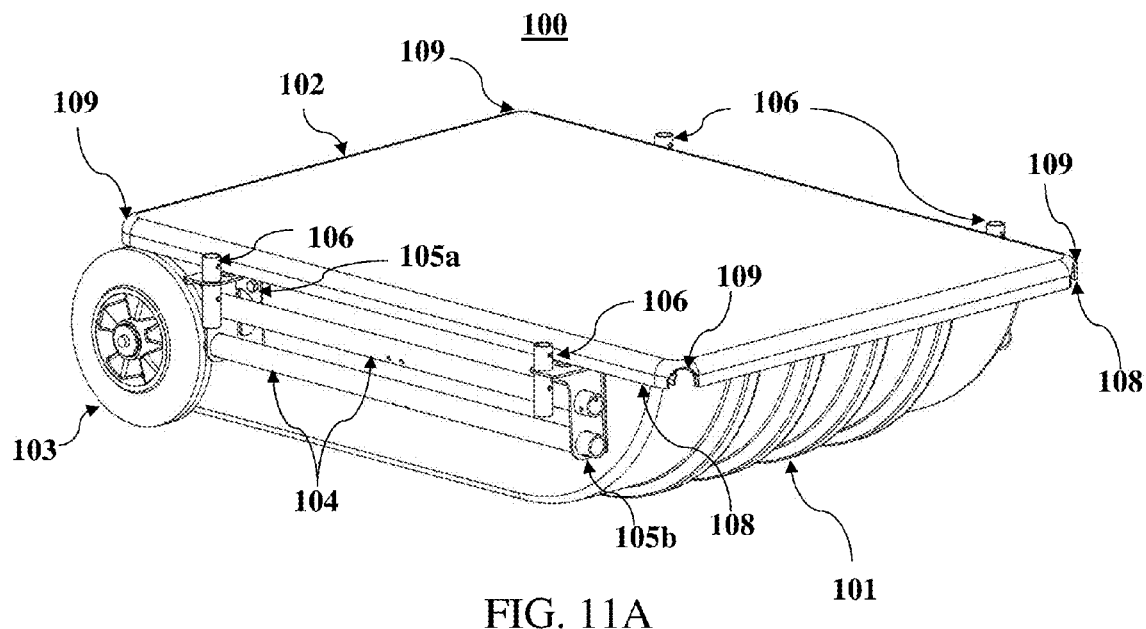
FIGS. 11A-11B illustrate an alternative multi-function cart according to one or more embodiments of the invention.
Figure 11B:
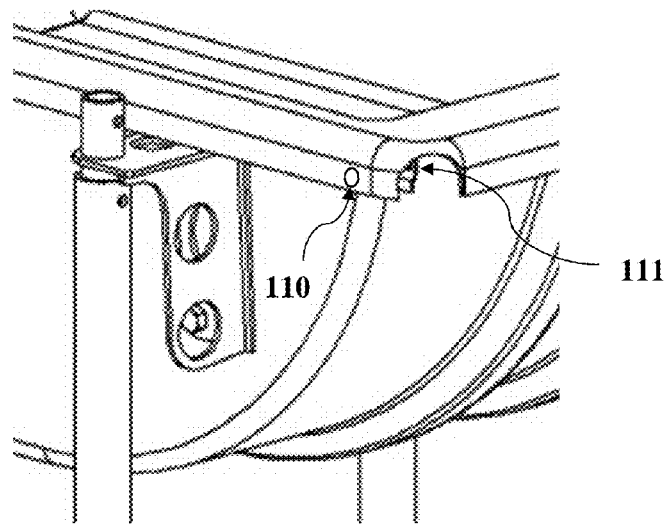

FIGS. 11A-11B illustrate an alternative form of exemplary multi-function cart 100 according to one or more embodiments of the invention. Multi-function cart 100 comprises shell 101, wheel assembly 103, tubes 104, hub brackets 105*a-b*, and adapters 106 in similar fashion to what has been discussed above. In addition, multi-function cart 100 further comprises a lid 102, such that shell 101 can form a substantially sealed container without the use of second shell 101. Lid 102 can form a water or airtight seal when attached to shell 101 to protect the supplies (such as when multi-function cart 100 is stored outdoors). Lid 102 can be made of plastic (e.g. polyethylene), metal, composites, or any other suitable material, as discussed above with respect to shell 101. Although FIGS. 11A-11B illustrate this version of shell 101 as having a sled shape, shells of other concave shapes can also be used, as discussed above.

As may be seen in FIGS. 11A-11B, shell 101 also includes lip 108 and openings 109, and the functionality, modifications, and configurations discussed above with respect to the embodiment of FIGS. 1A-1D may be similarly made to or achieved with the embodiment of FIGS. 11A-11B. For example, wheel assembly 103 shown in FIG. 1A may be replaced by a version of wheel assembly 103 resembling the version shown in FIG. 8A, and the other modifications for durability and the like may also be incorporated into the version of multi-function cart 100 shown in FIGS. 11A-11B. As may be seen in FIGS. 11A-11B, lid 102 may be configured with openings corresponding to openings 109 of lip 108, thereby allowing the functionality discussed herein to be achieved while lid 102 is covering shell 101.

Figures 12A, 12B:
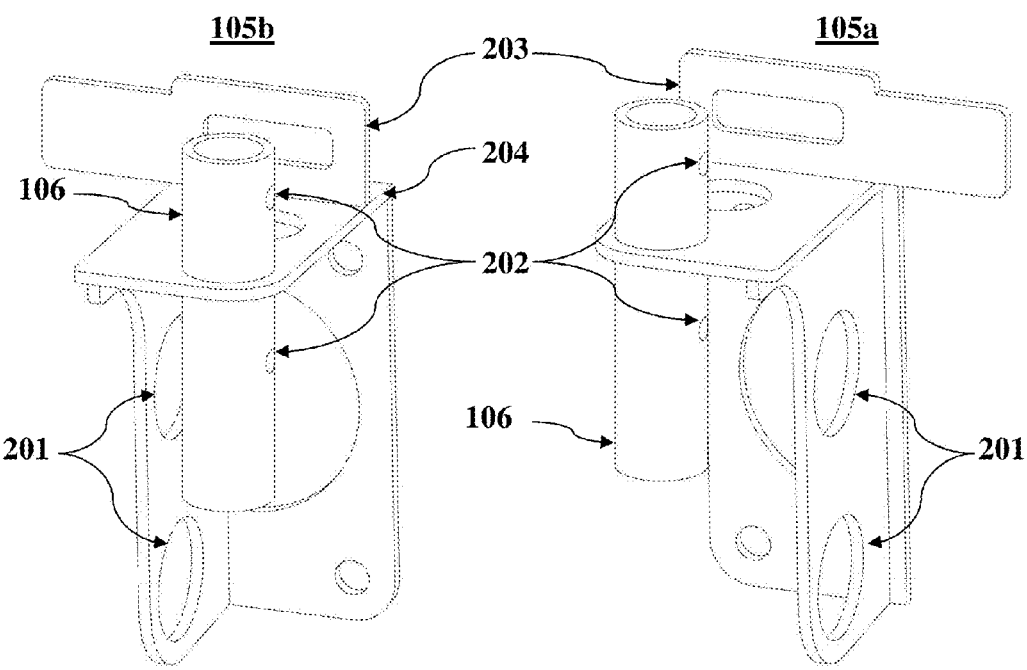
FIGS. 12A-12B illustrate exemplary hub brackets that are attached to the embodiment of FIGS. 11A-11B.

In some instances, shell 101 of FIGS. 11A-11B may be somewhat smaller than shell 101 of, for example, FIGS. 1A-1B. Hub brackets 105a-b may be modified to account for anticipated lower cart loads and to achieve lower weight, as is illustrated in FIGS. 12A-12B, which shows an alternative version of hub brackets 105a-b. While this version of hub brackets 105a-b is illustrated as lacking portion 206 to engage with stiffening bar 207, a further version of hub brackets 105a-b may be provided that incorporates portion 206 for engagement with stiffening bar 207. Further, hub brackets 105a-b as shown in FIGS. 12A-12B may be formed, manufactured, or configured with a fixed stiffening bar 207 such that only a single hub bracket 105 is provided, as discussed above. Similarly, where shell 101 is smaller and the total weight of multi-function cart 100 and its contents is anticipated to be lower, wheel assembly 103 may be modified to be lighter duty or may be omitted entirely as discussed above.

Figure 13A:
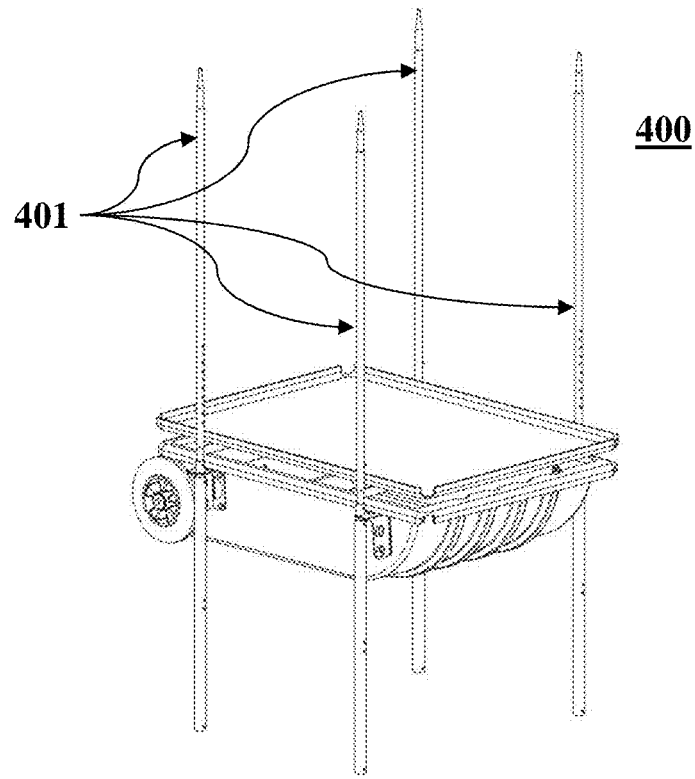
FIGS. 13A-13B illustrate configurations of the embodiment of FIGS. 11A-11B.
Figure 13B:
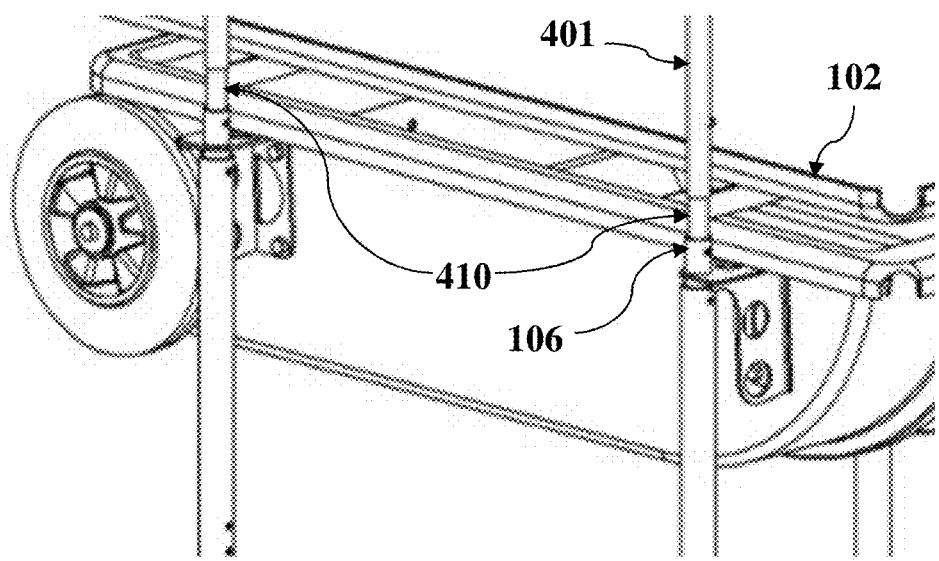

FIGS. 13A-13B illustrate how lid 102 may be used to provide an elevated work area 304 and canopy assembly 400 using multi-function cart of FIGS. 11A-11B. These Figures further illustrate that optionally all the functionality discussed herein may be incorporated in or utilized with the embodiment of multi-function cart shown in FIGS. 11A-11B In this configuration, lid 102 provides elevated work area 304 that substantially covers the opening of shell 101. Such a configuration may provide an enlarged work area in comparison with the configuration shown in FIGS. 4A-4B or FIGS. 10C-10F (assuming the size of shell 101 to be similar). In some embodiments, as illustrated in FIGS. 13A-13B, lid 102 may be inverted such that portions of lid 102 corresponding to lip 108 serve to retain many items that might otherwise be prone to rolling or falling off of elevated work area 304.

Multi-function cart 100 can be used to store and transport virtually any supplies. In some embodiments, in addition to the components described above, multi-function cart 100 can include emergency supplies, cooking supplies, toiletries, and other common supplies for an emergency or 72 hour kit for an individual, a family, a business, a school or other institution, a church, or a building. To facilitate the storage of items, multi-function cart 100 can include one or more internal dividers or compartments. The dividers can be formed of any suitable material, and can be integrated, removable, interchangeable, segregable, reconfigurable, upgradeable, etc. The supplies can be stored within multi-function cart 100 using various numbers of custom bags or packs that are sized and shaped to fit within multi-function cart 100 (e.g. within specific compartments). As needed or desired, the individual bags or packs can be supplied with sleeves or pouches into which any of a variety of instructional materials can be inserted, similar to the sleeve(s) or pouch(es) discussed above with respect to cover 120. For example, the sleeves could contain lists of contents, instructions, diagrams, pictographs, pictures, etc. Any such sleeves may be transparent to permit viewing of the contents within, and may be sealable. As with cover 120, instructional materials may be printed on the bags or packs or may be sewn on or otherwise permanently or semi-permanently affixed to the bags or packs.

A multi-function cart 100 containing such contents can be purchased, supplied, or otherwise distributed to serve as a single unit storing essential emergency supplies which can be converted into the various configurations as described above to assist in sustaining life, providing relief, or cleaning up when an emergency occurs.

Additionally, because multi-function cart 100 can comprise two identical shells 101, multi-function cart 100 can provide two emergency units or kits (i.e. two sets of supplies can be included within multi-function cart 100). Accordingly, when an emergency occurs, multi-function cart 100 can be divided into two shells 101, whether the shells are of the same size, shape, material, etc., to support two families or groups in an emergency or other situation, including two families or groups separated by any distance.

Further, multi-function cart 100 can also be used in non-emergency scenarios. In short, because of its compact and portable design, multi-function cart 100 can be used as a storage unit for virtually any supplies, and converted into various different devices for use in many different scenarios. For example, a mobile merchant can use multi-function cart 100 to conveniently store, transport, and display his or her goods.

Similarly, multi-function cart 100 can be used recreationally. For example, multi-function cart 100 can be easily transported (e.g. in the back of a truck or any other vehicle, or secured to the top of a vehicle) for use while camping. After arriving near a campsite, multi-function cart 100 can be converted into wheeled cart 301 or carrier 302 or 303 for transport to the campsite. Further, multi-function cart 100 can be converted into elevated work area 304 at the campsite to provide an area for cooking, cleaning, etc. while using canopy assembly 400 to provide shade or cover either with elevated work area 304 or as a stand-alone unit. Canopy assembly 400 could also be used to collect (and filter) rain water as shown in FIG. 6H.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A multi-function cart comprising:
   a first and a second shell, wherein each shell comprises:
   a first side;
   a second side opposing the first side;
   a lip extending along a top edge of the first and second sides;
   a plurality of tubes; and
   a first pair of hub brackets attached on the fist side of the shell and a second pair of hub brackets attached on the second side of the shell, each of the hub brackets being positioned on the sides of the shell so that an opening is formed between the lip and the hub bracket into which any of the interchangeable tubes can be inserted to form a handle for the shell, each hub bracket including an adapter that is configured to allow any of the tubes to be attached thereto, each hub bracket also having at least one hole through which a tube can be inserted, each pair of hub brackets being aligned on the corresponding side of the shell so that one or more tubes can be stored along the surface of the shell by inserting each tube through a corresponding hole in each hub bracket of the pair of hub brackets, and so that the first shell can be secured to the second shell when the second shell is aligned with the first shell by connecting each hub bracket on the first shell to an opposing hub bracket on the second shell.

2. The multi-function cart of claim 1, further comprising support ribs molded with the shell between hub brackets on the first and second sides of the shell.

3. The multi-function cart of claim 1, wherein at least one of the hub brackets comprises a portion extending near or through an opening in the lip, the portion being configured such that the tubes can be inserted through the opening and surrounding the portion to form a handle for the shell.

4. The multi-function cart of claim 1, wherein each shell further comprises an element selected from the group consisting of:
 a wheel assembly fixedly disposed proximate a lower rear portion of the shell;
 a wheel assembly fixedly disposed proximate a lower rear portion of the shell and a wheel removably attached proximate a forward half of the shell; and
 a wheel assembly fixedly disposed proximate a lower rear portion of the shell and a caster removably attached proximate a forward half of the shell.

5. The multi-function cart of claim 4, wherein two tubes are attachable as handles on an end of the shell opposite the wheel assembly to form a wheeled cart.

6. The multi-function cart of claim 4, wherein a tube is attachable as a handle at each corner of the shell to form a two-person carrier.

7. The multi-function cart of claim 4, wherein two tubes are attachable as handles on the end of the shell opposite the set of wheels, and tubes are attachable in an upward position to each of the top adapters to form a bulk cart.

8. The multi-function cart of claim 1, wherein tubes are attachable in a downward position to bottom adapters of each hub bracket to form an elevated basin, and are attachable in a downward position to top adapters of each hub bracket when the shell is inverted to form an elevated work area.

9. The multi-function cart of claim 8, further comprising internal support ribs extending along an inner surface of the shell between hub brackets on the fist and second sides of the shell.

10. The multi-function cart of claim 9, further comprising a stiffening bar extending between hub brackets on each side of the shell.

11. The multi-function cart of claim 9, further comprising a canopy assembly, the canopy assembly comprising telescoping tubes and a canopy, wherein the telescoping tubes are attachable in an upward position to the upper adapters to form supports for the canopy.

12. The multi-function cart of claim 11, wherein the canopy includes an element selected from the group consisting of holes through which ends of the telescoping tubes are inserted, sleeves into which the tapered ends of the telescoping tubes are inserted, and receivers into which ends of the telescoping tubes are inserted.

13. The multi-function cart of claim 11, wherein the canopy includes an opening for draining water collected in the canopy when the canopy is used in an inverted configuration.

14. The multi-function cart of claim 8, further comprising a pair of bicycle forks that are configured to attach to the bottom adapters in the same manner as the tubes, and a yoke bracket for connecting together two tubes that are attached to the shell as handles to form a yoke thereby converting the shell into a cart or trailer.

15. The multi-function cart of claim 14, further comprising a fork stabilizer attached to and extending between the bicycle forks.

16. The multi-function cart of claim 14, further comprising a universal adapter that connects to the yoke bracket, the universal adapter being configured to attach to a bicycle or other vehicle and including swivel joints to allow swiveling in vertical, horizontal, and rotational directions.

17. The multi-function cart of claim 1, wherein the first and second shells are lockable together, and the multi-function cart is lockable to a structure via one or more of the hub brackets.

18. A multi-function cart comprising:
 a first shell having a first side, a second side, and a lip along a top edge of the first and second sides, the lip having an opening on each of the first and second sides at a front of the shell; and
 a plurality of tubes;
 wherein the shell has a first pair of hub brackets attached on the first side of the shell and a second pair of hub brackets attached on the second side of the shell, each pair of hub brackets being configured with means for storing one or more of the tubes;
 wherein each hub bracket also includes an adapter configured to receive one of the tubes, and wherein each of the pair of hub brackets includes a portion that extends to a corresponding opening, the portion configured such that one of the tubes can be inserted through the opening and secured to the portion to form a handle for the shell.

19. A multi-function cart comprising:
 a plurality of tubes;
 a first shell comprising:
  a first side;
  a second side opposing the first side;
  a lip extending along a top edge of the first and second sides;
  a first pair of hub brackets attached on the first side of the first shell and a second pair of hub brackets attached on the second side of the first shell, each of the hub brackets being positioned on the sides of the shell so that an opening is formed between the lip and the hub bracket into which any of the interchangeable tubes can be inserted to form a handle for the shell, each hub bracket including an adapter configured to allow any of the tubes to be attached thereto, each hub bracket also having at least one hole through which a tube can be inserted, each pair of hub brackets being aligned on the corresponding side of the first shell so that one or more tubes can be stored along the surface of the first shell by inserting each tube through a corresponding hole in each hub bracket of the pair of hub brackets; and
 a second shell comprising:
  a first side;
  a second side opposing the first side;
  a lip extending along a top edge of the first and second sides;

a first pair of hub brackets attached on the first side of the second shell and a second pair of hub brackets attached on the second side of the second shell, each of the hub brackets being positioned on the sides of the shell so that an opening is formed between the lip and the hub bracket into which any of the interchangeable tubes can be inserted to form a handle for the shell, each hub bracket including an adapter configured to allow any of the tubes to be attached thereto, each hub bracket also having at least one hole through which a tube can be inserted, each pair of hub brackets being aligned on the corresponding side of the second shell so that one or more tubes can be stored along the surface of the second shell by inserting each tube through a corresponding hole in each hub bracket of the pair of hub brackets;

wherein the hub brackets on the first and second shell are aligned so that the first shell can be secured to the second shell when the second shell is aligned with the first shell by connecting each hub bracket on the first shell to an opposing hub bracket on the second shell.

20. The multi-function cart of claim 19, wherein the first shell and the second shell can be secured to each other using a mechanism configured to draw the corresponding hub brackets of the first shell and the second shell together so as to create a seal between the first shell and the second shell.

* * * * *